United States Patent
Lin

(10) Patent No.: US 9,743,139 B2
(45) Date of Patent: Aug. 22, 2017

(54) METHODS AND SYSTEMS FOR DETECTING OVERLAPS BETWEEN CALENDAR APPOINTMENTS AND MEDIA ASSET TRANSMISSION TIMES

(71) Applicant: Rovi Guides, Inc., Santa Clara, CA (US)

(72) Inventor: Edison Lin, Menlo Park, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/998,109

(22) Filed: Dec. 23, 2015

(65) Prior Publication Data

US 2017/0188098 A1    Jun. 29, 2017

(51) Int. Cl.

| | |
|---|---|
| H04N 21/475 | (2011.01) |
| H04N 21/458 | (2011.01) |
| H04N 21/482 | (2011.01) |
| H04N 21/45 | (2011.01) |
| H04N 21/84 | (2011.01) |
| H04N 21/43 | (2011.01) |
| H04N 21/488 | (2011.01) |

(52) U.S. Cl.
CPC ......... *H04N 21/4583* (2013.01); *H04N 21/43* (2013.01); *H04N 21/4508* (2013.01); *H04N 21/482* (2013.01); *H04N 21/4821* (2013.01); *H04N 21/4882* (2013.01); *H04N 21/84* (2013.01)

(58) Field of Classification Search
CPC ........... H04N 21/4755; H04N 21/4583; H04N 21/4821; H04N 21/4882
See application file for complete search history.

(56) References Cited

U.S. PATENT DOCUMENTS

2003/0086694 A1    5/2003   Davidsson
2006/0117349 A1    6/2006   Ruhl
(Continued)

FOREIGN PATENT DOCUMENTS

WO    WO-2014135188    9/2014

OTHER PUBLICATIONS

International Search Report, International Application No. PCT/US2016/068020, mailed Feb. 24, 2017, 12 pages.

*Primary Examiner* — Pankaj Kumar
*Assistant Examiner* — Charles N Hicks
(74) *Attorney, Agent, or Firm* — Ropes & Gray LLP

(57) ABSTRACT

Systems and methods are described for a media guidance application that enables a user to distinguish media assets that overlap with the user's appointments from media assets that do not. Specifically, a media guidance application may access the user's calendar application and receive the user's calendar data from that calendar application. The media guidance application may compare the user's calendar data with media asset scheduling data in order to determine whether any overlaps exist. For each overlapping media asset, the media guidance application may store a conflict indicator. The media guidance application may generate for display a set of media asset identifiers (e.g., program listings) where the media asset identifiers that overlap with at least one calendar appointment are visually distinguished from the media asset identifiers that do not overlap with any calendar appointments.

18 Claims, 12 Drawing Sheets

(56) References Cited

U.S. PATENT DOCUMENTS

| | | | |
|---|---|---|---|
| 2006/0218577 A1* | 9/2006 | Goodman | G06Q 30/02 725/32 |
| 2012/0174039 A1 | 7/2012 | Rhoads et al. | |
| 2012/0290956 A1* | 11/2012 | Lance | G06Q 10/1093 715/764 |
| 2013/0104170 A1 | 4/2013 | Su | |
| 2013/0173796 A1* | 7/2013 | Grab | H04N 21/251 709/225 |
| 2015/0249747 A1* | 9/2015 | Boss | H04M 3/42221 379/85 |
| 2016/0029085 A1* | 1/2016 | Mountain | H04N 21/4583 725/43 |

* cited by examiner

500

502
Receive, from a calendar application, calendar data for a plurality of events associated with a user, where the calendar data includes event time intervals having associated event start times and end times;

504
Compare the event time intervals of the plurality of events with media asset time intervals of a first plurality of media assets, where each media asset of the first plurality of media assets has an associated media asset start time and end time and is scheduled for transmission to a plurality of users during a corresponding media asset time interval;

506
Based on the comparing, store in a corresponding media asset database entry, a conflict indicator, for a first plurality of media asset identifiers corresponding to a second plurality of media assets, where the second plurality of media assets includes media assets from the first plurality of media assets that have an associated media asset time interval that overlaps at least in part with at least one of the event time intervals 508
Generate for display a second plurality of media asset identifiers corresponding to media assets that are scheduled for transmission to the plurality of users during a time period, where the second plurality of media asset identifiers has a first portion that includes media asset identifiers included in the first plurality of media asset identifiers and a second portion that includes media asset identifiers not included in the first plurality of media asset identifiers, and wherein the media asset identifiers in the first portion are visually distinguished from the media asset identifiers in the second portion.

```
701 ...
702 Initialization Subroutine
703 ...
704 //Routine to receive calendar data for a plurality of events associated with
       a user:
705 current-user = Retrieve-user ()
706 new-request = Request-calendar-data (current-user)
707 calendar-data = transmit.new-request (server-name)
708 events [] = parse-data (calendar-data)
709 For each event in events
710       event-query = create-event=query (event)
711       existing-event = transmit-to-database(event-query, server-name)
712       If  existing-event == NULL
713             create-new-database-entry (event)
714             transmit-to-database(entry, server-name)
715       else
716             event-data = parse(event)
717             existing-data =  parse(existing-data)
718             Match = data-compare(event-data, existing-data)
719                   if (match == FALSE)
720                         update-existing (event-data)
721                   end if
722       end if
723 next step of the For Loop
724 ...
725 Termination Subroutine
726 ...
```

```
901 ...
902 Initialization Subroutine
903 ...
904 //Routine to identify media assets that overlap with calendar events:
905   event-entries[] = Retrieve-calendar-events(server-name)
906   media-asset-entries[] = Retrieve-media-asset-entries(server-name)
907   For each event-entry in event-entries[] // outer For loop
908       event-start = Retrieve-start-time(event-entry)
909       event-end = Retrieve-end-time(event-entry)
910       For each media-asset-entry in media-asset-entries[] // inner For Loop
911           MA-start = Retrieve-start-time(media-asset-entry)
912           MA-end = Retrieve-end-time(media-asset-entry)
913           If (event-start > MA.start and event-start < MA-end)
914               media-asset-entry.update (event-entry)
915               media-asset-entry.add (new(conflict indicator))
916           end if
917           If (event.end > MA.start and event.end < MA.end)
918               media-asset-entry.update (event entry)
919               media-asset-entry.add (new(conflict indicator))
920           end if
921       Next Step of the Inner For Loop
922   Next Step for the Outer For Loop
923 ...
924 Termination Subroutine
925 ...
```

```
1101 ...
1102 Initialization Subroutine
1103 ...
1104 //Routine to store a conflict indicator with appropriate media asset
       identifier entry:
1105 media-asset-entries[] = Retrieve-media-asset-entries()
1106 updated-entries[] = detect-updates(media-asset-entries[])
1107 if updated-entries [] == NULL
1108      Termination Subroutine
1109 end if
1110 status = 0
1111 while (status == 0)
1112      status = connect-database (server-name)
1113 Next step of the while loop
1114 For each updated-entry in updated-entries[]
1115           query = generate-query (updated-entry)
1116           update-status = update(query, server-name)
1117        if update-status == fail
1118           write-log(update-status, update-status.error)
1119        end if
1120 Next Step of the For Loop
1121 ...
1122 Termination Subroutine
1123 ...
```

```
1301 ...
1302 Initialization Subroutine
1303 ...
1304 //Routine to generate for display media asset identifiers while visually
     distinguishing media asset identifiers that conflict with events:
1305 time-period = retrieve-time-period()
1306 content sources[] = retrieve-content-sources ()
1307 query = create-query(time-period, content-sources[])
1308 media-asset-identifiers[] = Query-database(query, media-asset-identifier database)
1309 if (media-asset-identifiers[] <> NULL)
1310       for each MAI in media-asset-identifiers[]
1311             database-entry = retrieve-database-entry (MAI)
1312             if (database-entry.conflict-indicator == true)
1313                   visual-indicator = find-visual-indicator (conflict-indicator)
1314                   display.add-to-display (MAI, visual-indicator)
1315
1316             else display.add-to-display (MAI)
1317             end if
1318       next step of the For Loop
1319       render (display)
1320 end if
1321 ...
1322 Termination Subroutine
1323 ...
```

FIG. 13

METHODS AND SYSTEMS FOR DETECTING OVERLAPS BETWEEN CALENDAR APPOINTMENTS AND MEDIA ASSET TRANSMISSION TIMES

BACKGROUND

In conventional systems, users have access to a plethora of media content. In most cases, users can view what content will be available in the future through a media guidance application. Through the same media guidance application a user can find a channel number and a time that specific content that the user desires to consume will be transmitted. However, a user often requires assistance in determining whether he or she is going to be able to consume the desired media asset because the user may have a prior engagement. In current systems, users are forced to consult their personal calendars in order to determine if a prior engagement will prevent the user from consuming the desired media content. This is inefficient, time-consuming, and is confusing to users.

SUMMARY

Accordingly, systems and methods are described herein for a media guidance application that enables a user to distinguish media assets that overlap with user's appointments from media assets that do not. Specifically, the media guidance application may access a user's calendar application and receive the user's calendar data from that calendar application. The media guidance application may compare the user's calendar data (e.g., appointment start times and end times) with media asset scheduling data (e.g., media asset start times and end times) in order to determine whether any overlaps exist. For each overlapping media asset, the media guidance application may store a conflict indicator. The media guidance application may generate for display a set of media asset identifiers (e.g., program listings) where the media asset identifiers that overlap with at least one calendar appointment are visually distinguished from the media asset identifiers that do not overlap with any calendar appointments.

For example, the media guidance application may receive a request from a user for media asset identifiers (e.g., program listings) for a future time. The media guidance application may generate for display, together with the media asset identifiers, a visual indicator or multiple visual indicators to inform the user as to which media asset transmission times would overlap with the user's appointments in that future time period.

In some aspects, a media guidance application may receive, from a calendar application, calendar data for a plurality of events associated with a user. The calendar data may include event time intervals having associated event start times and event end times. For example, a user may have an associated calendar that is hosted by a service provider. The associated calendar may include events (e.g., user's appointments) that have scheduled start times and end times. These events may also include a plethora of other metadata such as a description, appointment location, subject, reminder data, priority information, etc. The media guidance application may receive that information from a server associated with the service provider. It should be noted that start times and end times include both the date and time. It should be noted that the media guidance application may retrieve calendar data from multiple calendars (e.g., a work calendar and a personal calendar).

The media guidance application may compare the event time intervals of the plurality of events with media asset time intervals of a first plurality of media assets. Each media asset of the first plurality of media assets involved in the comparison may have an associated media asset start time and end time and may be scheduled for transmission to a plurality of users during a corresponding media asset time interval. For example, the media guidance application may have received a multitude of appointments that are associated with the user. The media guidance application may determine which media asset transmission times overlap with the times of the received appointments by comparing the start times and end times of the appointments with transmission time of the media assets. The media guidance application may determine that a specific media asset overlaps with one appointment, multiple appointments, or no appointments.

The media guidance application may, based on the comparing, store in a corresponding media asset database entry a conflict indicator for a first plurality of media asset identifiers corresponding to a second plurality of media assets. The second plurality of media assets may include media assets from the first plurality of media assets that have an associated media asset time interval that overlaps at least in part with at least one of the event time intervals. In some embodiments, the media guidance application may also include a priority associated with the overlapping event in the corresponding media asset database entry. For example, the media guidance application may have determined during the comparison described above that ten media assets overlap with the user's appointments. Furthermore, the media guidance application may have determined that two of the ten media assets overlap with multiple appointments. Based on this determination, the media guidance application may store a conflict indicator in a corresponding media asset database entry. Alternatively or additionally, the media guidance application may store one conflict indicator corresponding to each overlapping appointment. A conflict indicator may be a binary value indicating a conflict. Additionally or alternatively, a conflict indicator may include information about the overlapping appointment, a pointer to that information, and/or a pointer to the appointment itself. The pointer to the appointment may be pointing to the appointment in the received calendar data or to the appointment in the calendar application.

The media guidance application may generate for display a second plurality of media asset identifiers corresponding to media assets that are scheduled for transmission to the plurality of users during a time period. The second plurality of media asset identifiers may include a first portion that comprises media asset identifiers included in the first plurality of media asset identifiers and a second portion that includes media asset identifiers not included in the first plurality of media asset identifiers. The media asset identifiers in the first portion may be visually distinguished from the media asset identifiers in the second portion. For example, the media guidance application may have generated for display a grid of media asset identifiers for media assets that are scheduled to be transmitted from 5 PM to 7 PM (horizontal axis) on channels 1 to 5 (vertical axis). If the user has a doctor's appointment from 4:30 PM to 5:30 PM, the media asset identifiers corresponding to media assets that will be in the process of being transmitted between 5 PM and 5:30 PM will be visually distinguished from media asset identifiers corresponding to media assets that will not be in the process of being transmitted between 5:00 PM and 5:30 PM. For example, the media guidance application may add a specific shading pattern to the overlapping media asset identifiers. The media guidance application may add the shading pattern to a full media asset identifier being displayed or only the overlapping portion. Additionally or alternatively, the media guidance application may add an icon to the overlapping media asset identifiers to indicate a conflict.

In some embodiments, the media guidance application may visually distinguish media asset identifiers associated with events of different priorities. Specifically, the media guidance application may determine a first priority of a first event of the plurality of events that overlaps at least in part with a transmission time of a first media asset corresponding to a first media asset identifier in the first portion. The media guidance application may also determine a second priority of a second event of the plurality of events that overlaps at least in part with a transmission time of a second media asset corresponding to a second media asset identifier in the first portion. The media guidance application may visually distinguish the first media asset identifier in the first portion from the second media asset identifier in the first portion based on the first priority being different from the second priority.

For example, the media guidance application may assign a high priority to an event that corresponds to a business meeting and a low priority to an event that corresponds to the user's gym time. The media guidance application may retrieve the priority information from the calendar application together with the other calendar data (i.e., start time, end time, etc.). In some embodiments, the media guidance application may determine a priority associated with a specific event based on the content of the event. Some possible methods for determining a priority associated with an event are discussed below. When the media guidance application generates for display, in the same display screen, two media asset identifiers that correspond to the two events, respectively, the media guidance application may visually distinguish the two events by different colors (e.g., the media asset identifier corresponding to the high priority event may be displayed in red and the media asset identifier corresponding to the low priority event may be displayed in green). It should be noted that other color combinations and event priorities may be assigned to events. For example, the media guidance application may assign a medium priority to a third event and visually distinguish the corresponding media asset identifier by displaying that media asset identifier in yellow.

In some embodiments, the media guidance application may generate for display different indicators with different media asset identifiers based on a priority of the overlapping event. Specifically, the media guidance application may store a first visual indicator associated with the first priority and a second visual indicator associated with the second priority and generate for display the first media asset identifier with the first visual indicator and the second media asset identifier with the second visual indicator. For example, the media guidance application may generate for display a media asset identifier associated with a high priority event with an icon that includes the word "high" in it and a media asset identifier associated with a low priority event with an icon that includes the word "low" in it.

In some embodiments, the media guidance application may provide, to the user, different options based on selections of media asset identifiers corresponding to overlapping events of different priorities. Specifically, the media guidance application may assign the first priority to those events of the plurality of events that may be rescheduled and the second priority to those events of the plurality of events that may not be rescheduled. In response to a user selection of the first media asset identifier, the media guidance application may generate for display calendar data associated with the first event and provide an option to a user to reschedule the first event. However, in response to a user selection of the second media asset identifier, the media guidance application may generate for display calendar data associated with the second event and provide an option to the user to record the second media asset.

For example, when the media guidance application receives a user selection of a media asset identifier corresponding to a low priority event, the media guidance application may generate for display an option to reschedule the event. If the media guidance application detects that a user has selected the option to reschedule the event, the media guidance application may enable the user to enter a different date and time for the event being rescheduled. The media guidance application may also enable the user to modify other portions of the event (e.g., title, description, reminder options, etc.). In another example, when the media guidance application receives a user selection of a media asset identifier corresponding to a high priority event, the media guidance application may generate for display an option to the user to record the corresponding media asset, without providing an option to reschedule the overlapping event.

In some embodiments, the media guidance application may, when comparing the event time intervals of the plurality of events with the media asset time intervals of the first plurality of media assets, perform the comparison based on start times and end times of the events and media assets, respectively. Specifically, the media guidance application may retrieve, for a first event in the plurality of events, a first start time and a first end time. The media guidance application may also retrieve, for a first media asset in the first plurality of media assets, a second start time and a second end time. The media guidance application may compare the first start time with the second start time and the second end time and also compare the first end time with the second start time and the second end time. Based on determining that the first start time or the first end time falls between the second start time and the second end time, the media guidance application may generate a first conflict indicator for the first media asset.

For example, the media guidance application may select, for comparison, a business lunch scheduled to start at 1:30 PM and end at 3:00 PM. The media guidance application may be comparing the business lunch with a sports event (e.g., a baseball game) that is being transmitted between 2:30 PM and 5:00 PM. The media guidance application may compare the 1:30 PM start time with the 2:30 PM start time and the 5:00 PM end time and determine that 1:30 PM does not fall between those two times; thus; no overlap is found. However, the media guidance application may also compare the 3:00 PM end time of the business lunch with the 2:30 PM start time and 5:00 PM end time of the baseball game and determine that 3:00 PM falls between 2:30 PM and 5:00 PM, thus finding an overlap.

In some embodiments, the media guidance application may visually distinguish the media asset identifiers in the first portion from the media asset identifiers in the second portion by a first type of an indicator and distinguish the first media asset identifier from the second media asset identifier with a second type of an indicator. For example, the media guidance application may generate for display a media asset identifier corresponding to a media asset overlapping with a business meeting and a media asset identifier corresponding to a scheduled gym session and assign to both of them an icon (i.e., one type of an indicator) indicating an overlap. However, the icon may be red for the media asset identifier corresponding to the business meeting and green corresponding to the scheduled gym session (i.e., a second type of an indicator). In some embodiments, types of indicators may include colors, shadings, icons, visual queues, audio queues, etc.

In some embodiments, the media guidance application may provide an option to the user to create a new scheduled event corresponding to a transmission time of a media asset that the user is planning to consume. Specifically, the media guidance application may, in response to a user selection of a first media asset identifier in the first portion, generate for display an option to create a new event corresponding to a first media asset associated with the first media asset identifier. The media guidance application may, in response to a user selection of the option, create the new event having an event start time and an event end time corresponding to a media asset start time and media asset end time of the first media asset, respectively. The media guidance application may transmit the new event to the calendar application. For example, if the user desires to watch a basketball game that is scheduled to be transmitted between 7 PM and 10 PM, the media guidance application may provide to the user an option to create a new event in response to the user selecting a media asset identifier associated with the basketball game. Once the media guidance application receives a user selection of the option to create the new event, the media guidance application may execute a routine to create the event and transmit the new event to the calendar application. In some embodiments, the media guidance application may enable the user to edit the newly created event before transmitting the event to the calendar application.

In some embodiments, the media guidance application may enable a user to invite another user to consume a media asset. Specifically, the media guidance application may receive, from the calendar application, calendar data for a plurality of events associated with a different user. The calendar data associated with the different user may include event time intervals having associated event start times and end times. In response to a user selection of a first media asset identifier in the first portion of the second plurality of media assets, the media guidance application may determine whether a transmission time of a media asset associated with the first media asset identifier overlaps at least in part with at least one of the event time intervals associated with the different user. Based on determining that the media asset associated with the first media asset identifier does not overlap at least in part with at least one of the event time intervals associated with the different user, the media guidance application may generate for display an option to invite the different user to consume the media asset associated with the first media asset identifier.

For example, a user may want to invite his or her spouse or a friend to consume the same media asset that the user is planning to consume. The media guidance application may accept input from the user providing a user identifier (e.g., an email address) associated with the user's friend or spouse. The media guidance application may retrieve calendar data associated with the friend or a spouse and then determine whether the friend or a spouse has a prior engagement during the transmission of the media asset. If no prior engagement is found, based on the calendar data, the media guidance application may provide an option to a user to invite the user's friend or spouse to consume the media asset. The media guidance application may transmit the invitation via email, a calendar invite, a Short Message Service ("SMS") message or any other method. It should be noted that the media guidance application may not have access to the full details of the other user's calendar; thus, the media guidance application may only retrieve free/busy information associated with the other user.

In some embodiments, the media guidance, application may generate for display a list of user's "friends" who are scheduled to consume a specific media asset. Specifically, the media guidance application may retrieve, from a server associated with a social networking application, a plurality of user identifiers associated with friends of the user. The media guidance application may retrieve, for each user identifier in the plurality of user identifiers, calendar data for a plurality of events associated with each friend. The calendar data may include event time intervals having associated event start times and end times. As discussed above, in this instance, the media guidance application may not have access to full details of the friends' calendar information and may only retrieve free/busy data. In response to a user selection of a first media asset identifier in the second plurality of media asset identifiers, the media guidance application may generate for display one or more user identifiers associated with those friends of the user that are scheduled to consume a media asset corresponding to the first media asset identifier.

For example, it may be desirable to provide to the user a list of his friends (e.g., from a social networking application) that are scheduled to watch or record a specific show (e.g., a presidential debate). The media guidance application may receive from the user a selection of the media asset identifier associated with the presidential debate. The media guidance application may generate for display a list of the user's friends from a social networking application that are scheduled to watch the presidential debate or record it.

BRIEF DESCRIPTION OF THE DRAWINGS

FIG. 5 depicts an illustrative process involved in visually distinguishing media asset identifiers corresponding to media assets that overlap with at least one event from media asset identifiers corresponding to media assets that do not, in accordance with some embodiments of this disclosure;

FIG. 7 depicts illustrative pseudo-code involved in receiving calendar data for a plurality of events associated with the user, in accordance with some embodiments of this disclosure;

FIG. 9 depicts illustrative pseudo-code involved in identifying media assets that overlap with calendar events, in accordance with some embodiments of this disclosure;

FIG. 11 depicts illustrative pseudo-code involved in storing conflict indicators with appropriate media asset identifier database entries, in accordance with some embodiments of this disclosure;

FIG. 13 depicts illustrative pseudo-code involved in generating for display media asset identifiers while visually distinguishing media asset identifiers that correspond to media assets that overlap with a user's calendar events, in accordance with some embodiments of this disclosure.

DESCRIPTION

Figure 1:
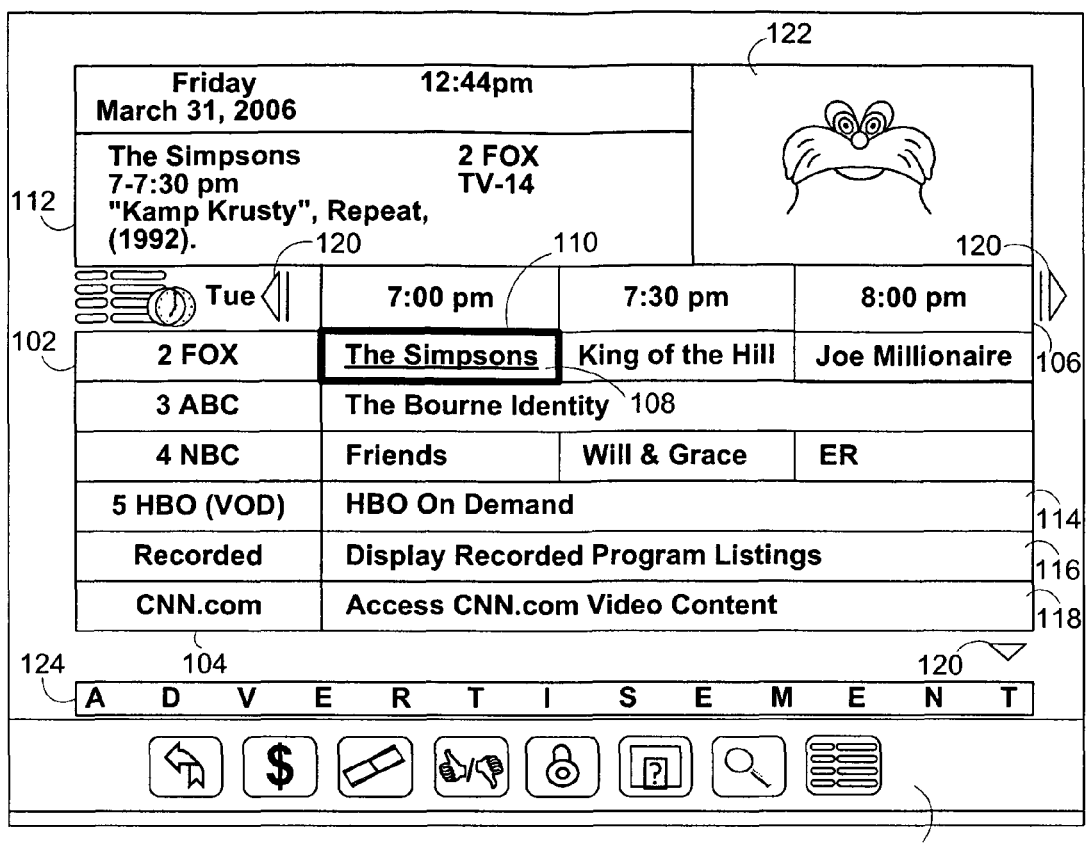
FIG. 1 shows an illustrative embodiment of a display screen that may be used to provide media guidance application listings and other media guidance information, in accordance with some embodiments of the disclosure.

A media guidance application is described herein that enables a user to distinguish media assets that overlap with the user's appointments from media assets that do not. Specifically, the media guidance application may access the user's calendar data (e.g., the user's calendar appointments) and receive the user's calendar data from that calendar application. The media guidance application may compare the user's calendar data with media asset scheduling data in order to determine whether any overlaps exist. For each overlapping media asset, the media guidance application may store a conflict indicator. The media guidance application may generate for display a set of media asset identifiers (e.g., program listings) where the media asset identifiers that overlap with at least one calendar appointment are visually distinguished from the media asset identifiers that do not overlap with any calendar appointments.

Furthermore, the media guidance application may visually distinguish between media asset identifiers that overlap with events of different priorities. In those instances, the media guidance application may generate for display media asset identifiers corresponding to media assets that overlap with events of one priority with one visual indicator and media asset identifiers corresponding to media assets that overlap with events of a second priority with a second visual indicator. The media guidance application may enable a user to reschedule the media assets that overlap with a low priority event, but not the media assets that overlap with a high priority event.

The media guidance application may also enable a user to create a new calendar event based on a media asset that the user wishes to consume. The media guidance application may transmit the event to the user's calendar application, enabling the user to view the event in his/her calendar. The media guidance application may enable a user to invite a different user to consume a media asset. Furthermore, the media guidance application may enable a user to see which of the user's friends are planning to consume or record a particular media asset.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
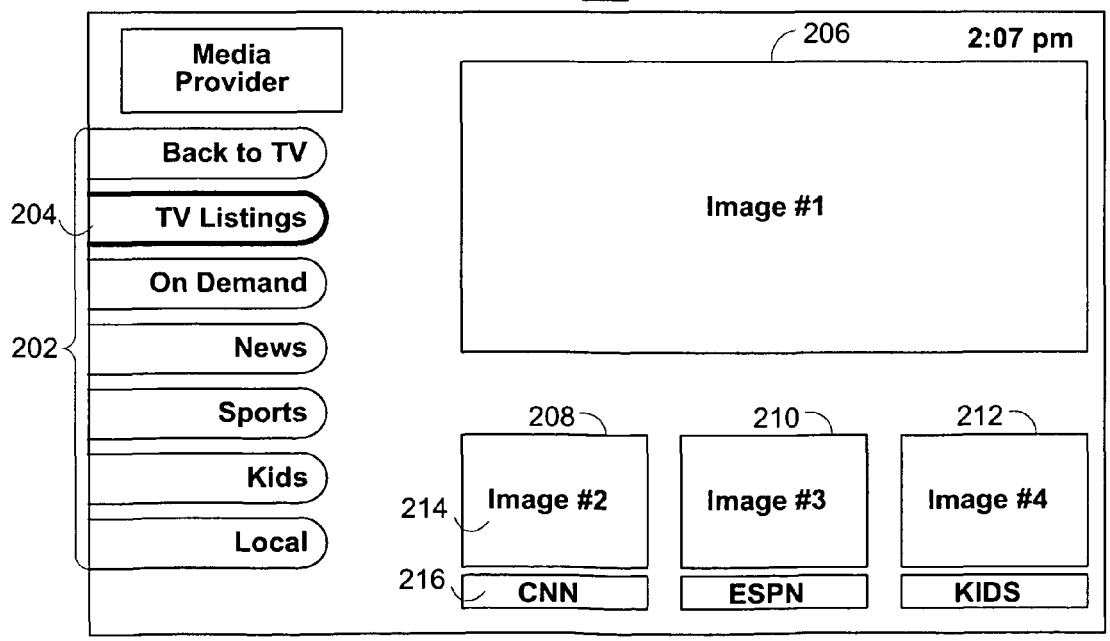
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), by calendar, or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within-a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program; or other features. Options available from a main menu display may include search Options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. The listing in display 200 may also be graphically accentuated based on received calendar data. For example, listings that correspond to media assets that overlap with events of high priority may be displayed in red while listings that correspond to media assets that overlap with low priority events may be displayed in green. In some instances listings that correspond to media assets that overlap with events may be highlighted or displayed in different sizes from listings that correspond to media assets that do not overlap. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
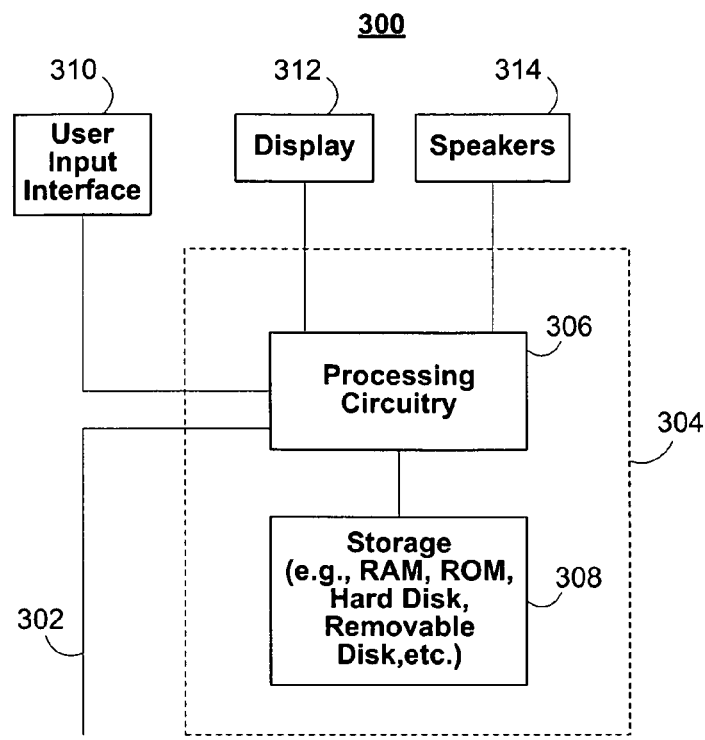
FIG. 3 is a block diagram of an illustrative device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem; an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Storage 308 may also be used to store calendar data received from a calendar application described above. Non-volatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
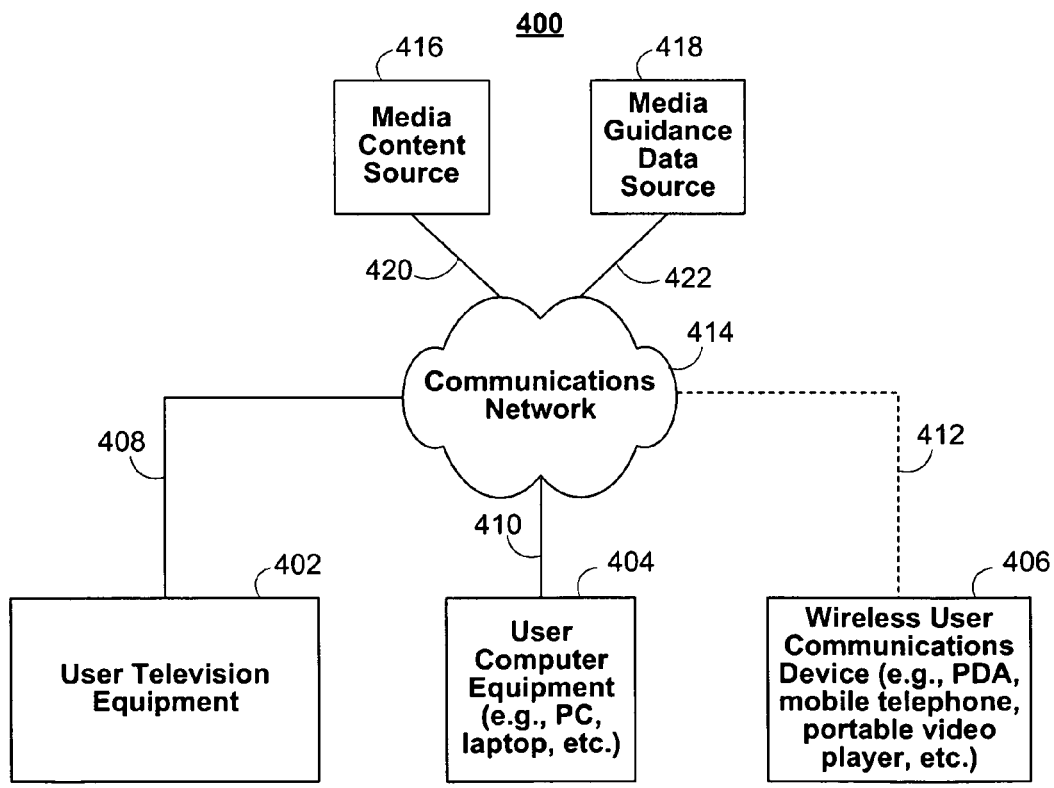
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. In addition, the user may set calendar settings across in-home and remote devices. For example, the user may enter his/her calendar application server, username, password, etc. on one device and that information may be detected and used by another device. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

In some embodiments, a media guidance application enables a user to distinguish media assets that overlap with the user's appointments from media assets that do not by performing steps of process 500 illustrated in FIG. 5. At step 502, the media guidance application receives (e.g., via control circuitry 304), from a calendar application, calendar data for a plurality of events associated with a user, where the calendar data includes event time intervals having associated event start times and end times. As referred to herein, the term "calendar data" refers to any data associated with the user's scheduled events. For example, calendar data may include doctors' appointments, business meetings, birthday reminders, etc. Calendar data may include, for example, event start times, end times, descriptions, subjects, participants' names, titles, reminder information, etc. At step 504, the media guidance application compares (e.g., via control circuitry 304) the event time intervals of the plurality of events with media asset time intervals of a first plurality of media assets, where each media asset of the first plurality of media assets has an associated media asset start time and end time and is scheduled for transmission to a plurality of users during a corresponding media asset time interval.

At step 506, the media guidance application (e.g., via control circuitry 304), based on the comparing, stores in a corresponding media asset database entry, a conflict indicator, for a first plurality of media asset identifiers corresponding to a second plurality of media assets, where the second plurality of media assets includes media assets from the first plurality of media assets that have an associated media asset time interval that overlaps at least in part with at least one of the event time intervals. The media asset database entry may be stored in a database that is located in storage 308 on the same device where the media guidance application resides. Additionally or alternatively, the media asset database may be stored at media content source 416 and/or media guidance data source 418 and may be accessed via communications network 414. As referred to here, the term "conflict indicator" refers to a data structure capable of indicating that an overlap exists. For example, a conflict indicator may be a Boolean value, a variable, a link to the overlapping event, and/or the data of the overlapping event.

At step 508, the media guidance application generates for display (e.g., via control circuitry 304) a second plurality of media asset identifiers corresponding to media assets that are scheduled for transmission to the plurality of users during a time period, where the second plurality of media asset identifiers has a first portion that includes media asset identifiers included in the first plurality of media asset identifiers and a second portion that includes media asset identifiers not included in the first plurality of media asset identifiers, and where the media asset identifiers in the first portion are visually distinguished from the media asset identifiers in the second portion.

Figure 6:
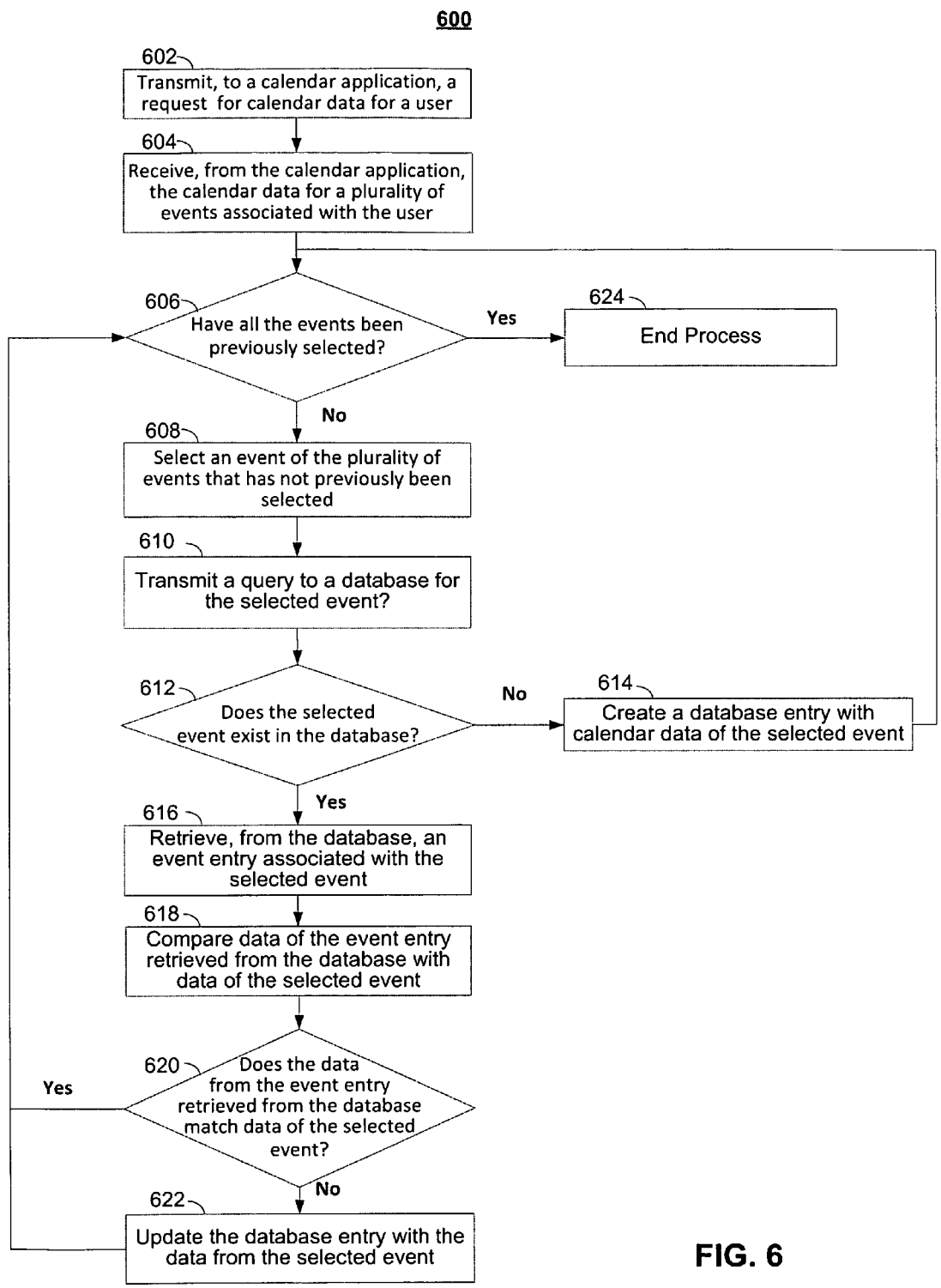
FIG. 6 depicts an illustrative process involved in receiving calendar data for a plurality of events associated with the user, in accordance with some embodiments of this disclosure.

Step 502 of process 500 is further exemplified by process 600 of FIG. 6. At step 602, the media guidance application transmits (e.g., via control circuitry 304 through I/O path 302), to a calendar application, a request for calendar data associated with a user. The calendar application may be stored on a remote server (e.g., a server associated with media content source 416 and or media guidance data source 418) or in storage 308 on the device where the media guidance application resides. The calendar application may also be located at a remote server managed by a third party and may be accessed through the Internet. As referred to herein, the term "calendar application" refers to software and/or hardware that enables storage of events associated with a user. For example, Google Calendar™ is a service that enables users to store calendar data and is considered a calendar application. It should be noted that some calendar applications may store calendar events for a single user while others store calendar events for multiple users. Other calendar applications may include Microsoft Exchange, Microsoft Outlook, Yahoo Calendar, etc. Additionally, calendar applications include any applications that are available on smart phones and other mobile device (e.g., tablets).

The media guidance application may perform step 602 in various ways. For example, the media guidance application may retrieve (e.g., from storage 308) a preconfigured value for a server that is hosting the user's calendar application. It should be noted that the preconfigured value can be retrieved from media content source 416 or media guidance data source 418. Additionally or alternatively, the media guidance application may retrieve a preconfigured value that includes the user's email address with an indication that the user's calendar is part of the email application. For example, during initial configuration (when the user first starts using the media guidance application), the media guidance application may provide an opportunity for the user to enter his or her email address. The media guidance application may store the email address and the indication in storage 308 or at media content source 416 and/or media guidance data source 418. The media guidance application may transmit a request to a server associated with the user's email for calendar data associated with the user.

If the user utilizes a service such as Google Mail™, the media guidance application may transmit a properly formatted request to Google's server for calendar data associated with the user. It should be noted that the request may include authentication information. Additionally or alternatively, the media guidance application may perform an authentication handshake with the server. The authentication handshake may take the form of a request from the media guidance application followed by a response from the server with a request for authentication information which would then be followed by the media guidance application transmitting the authentication information, to the server.

At step 604, the media guidance application receives (e.g., via control circuitry 304 through I/O path 302), from the calendar application, the calendar data for a plurality of events associated with the user. When the media guidance application receives the calendar data, the media guidance application may store that data in storage 308. Additionally or alternatively, the media guidance application may store the calendar data at media content source 416 and/or media guidance data source 418. The media guidance application may store the calendar data in various forms. For example, the media guidance application may store the calendar data in an XML file, in a database, or another data structure. It should be noted that the XML file and the database may be encrypted in order to keep the data secure while it is stored. It should also be noted that calendar data for multiple users may be stored in a database. The media guidance application may store the calendar data for multiple users in multiple XML files (one user's calendar data per file).

At step 606, the media guidance application begins a process to determine whether the received events have been previously received (e.g., by a previous request) and stores the new and updated events. It should be noted that these steps are described in relation to a database. However, these steps may be equally applicable to a file (e.g., an XML file) or another data structure. At step 606, the media guidance application determines (e.g., via control circuitry 304) whether all the received events have been previously selected. If all the events have been previously selected, the process moves to step 624 and ends. If not all events have been previously selected, process 600 moves to step 608 where the media guidance application selects (e.g., via control circuitry 304) an event of the plurality of events that has not previously been selected. For example, the media guidance application may store all newly received events in a temporary file, temporary data-structure, RAM, or in a temporary database table. The media guidance application may select one event at a time for determining whether that event matches an event that has already been previously received.

At step 610, the media guidance application transmits (e.g., via control circuitry 304 through I/O path 302) a query to a database for the selected event. For example, the media guidance application may create a query that may identify unique events as they are stored in the database. Specifically, this query may include a start time and an end time of the event as well as a description of the event. The query may also include the subject of the event. The media guidance application may first retrieve all entries where a start time and an end time matches with the selected event's start time and end time. In most cases, there will be one matching event or zero matching events. However, in some instances a user may have two or more events scheduled for the same time period. In these instances, the media guidance application may retrieve multiple entries. The database may reside locally (in storage 308) on the device where the media guidance application resides. Alternatively or additionally, the database may reside at media content source 416 and/or media guidance data source 418. It should be noted that in the instances where the event entries are stored in a file (e.g., an XML file) instead of a database, the media guidance application may parse the XML file instead of using a query.

At step 612, the media guidance application determines whether the selected event exists in the database. If no entries exist in the database matching both the start time and the end time of the selected event, process 600 moves to step 614, where the media guidance application creates a database entry with the calendar data from the selected event. Process 600 then moves to step 606. If at least one event exists in the database where both the start time and the end time match, process 600 moves to step 616 where the media guidance application retrieves (e.g., via control circuitry 304), from the database, an event entry associated with the selected event. It should be noted that in the instances where the event entries are stored in a file (e.g., an XML file), the media guidance application may retrieve the event entry from the file.

At step 618, the media guidance application compares (e.g., via control circuitry 304) data of the event entry retrieved from the database with the data of the selected event. The media guidance application may perform the comparison by comparing other data included with the event. For example, the media guidance application may compare the subject, description, reminder information, etc. At step 620, the media guidance application determines (e.g., via control circuitry 604) whether the event entry retrieved from the database matches data of the selected event. If the event entry matches the data of the selected event, process 600 moves to step 606 where the next event is selected for processing. If the data from the event entry retrieved from the database doesn't match data of the selected event, process 600 moves to step 622.

At step 622, the media guidance application updates (e.g., via control circuitry 304) the database entry with the data from the selected event. The media guidance application may overwrite the data in the database entry with the data from the selected event. Alternatively, the media guidance application may only overwrite the information that is different between the database entry and the selected event. Process 600 then proceeds to step 606.

It is contemplated that the descriptions of FIG. 6 may be used with any other embodiment of this disclosure. In addition, steps of process 600 may be performed in alternative orders or in parallel to further the purposes of this disclosure. For example, the media guidance application may use multiple logical processor threads or physical processors in order to increase performance. Furthermore, process 600 may be enhanced by incorporating branch prediction. It should be noted that process 600 may be implemented on a combination of appropriately configured software and hardware, and that any of the devices or equipment discussed in relation to FIGS. 3-4 may be used to implement one or more portions of the process.

FIG. 7 illustrates possible pseudo-code that may be used to implement process 600. It will be evident to one skilled in the art that pseudo-code of FIG. 7 may be implemented in any number of programming languages and on a variety of different hardware, and that the style and format should not be construed as limiting, but rather a general template of the steps and procedures that would be consistent with code used to implement process 600.

At line 702, the media guidance application executes (e.g., via control circuitry 304) a subroutine to initialize variables and prepare to start the routine to receive an emergency alert. For example, media guidance application may copy (e.g., via control circuitry 304) instructions from a non-transitory storage medium (e.g., storage device 308) into RAM or into the cache for processing circuitry 306. The media guidance application may execute the initialization subroutine in response to a signal from user input interface 310 notifying the media guidance application that user input has been received requiring the routine to begin.

At line 705, the media guidance application executes (e.g., via control circuitry 304) a function to retrieve the current user. At line 706, the media guidance application executes (e.g, via control circuitry 304) a function to create a new request. The new request is a request for calendar data and may include an indication of the current user. At step 707, the media guidance application executes (e.g., via control circuitry 304) a function to receive the calendar data. The function may take as input a name of the server where the calendar data resides and the new request created at line 706.

At line 708, the media guidance application may execute (e.g., via control circuitry 304) a function to parse the calendar data in order to separate out different events. The events may be stored in an array or another similar data structure that may be traversed in order to process each event. At line 709, the media guidance application executes (e.g., via control circuitry 304) a "For loop" to iterate through each received event. For each received event, the media guidance application, at line 710, generates (e.g., via control circuitry 304) a query to search for existence of the event in a database that stores previously received events. The media guidance application may generate the query in any manner described in connection to FIG. 6.

At line 711, the media guidance application executes (e.g., via control circuitry) a function to transmit the query to the database in order to receive any events that match the query. At line 712, the media guidance application determines (e.g., via control circuitry 304) whether any events have been matched to the event that is currently being processed. If no events match, the media guidance application, at line 713, executes (e.g., via control circuitry 304) a function to create a new database entry. The function may take as input the data associated with the event. At line 714, the media guidance application executes (e.g., via control circuitry 304) a function to transmit the new entry to the database for storage.

If, at line 715, the media guidance application determines that the event being processed matches an event in the database, the media guidance application, at line 716, executes (e.g., via control circuitry 304) a function to parse the event data. At line 717, the media guidance application executes (e.g., via control circuitry 304) a function to parse the event data of the event retrieved from the database. At line 718 the media guidance application compares (e.g., via control circuitry 304) the event data of the two events. The media guidance application may perform the comparison in any manner discussed in connection with FIG. 6.

At line 719, the media guidance application determines (e.g., via control circuitry 304) whether the data of the two events matches. If no match is found, the media guidance application, at line 720, executes (e.g., via control circuitry 304) a function to update the existing event with the new data. The media guidance application may perform the update in any manner discussed with respect to FIG. 6. If however, the data matches, the media guidance application does not update the data and moves to the next iteration of the "For Loop." The media guidance application proceeds to terminate (e.g., via control circuitry 304) the process, as indicated at line 725. For example, the media guidance application may clean up memory and destroy variables no longer needed.

It should be noted that pseudo-code in FIG. 7 may be implemented in any number of programming languages and on a variety of different hardware, and the particular choice and location of primitive functions, logical evaluations, and function evaluations are not intended to be limiting. It should also be noted that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

As discussed above, at steps 504 and 506 of FIG. 5, the media guidance application compares (e.g., via control circuitry 304) the event time intervals of the plurality of events with media asset time interval of a first plurality of media assets and, based on the comparing, stores in a corresponding media asset database entry a conflict indicator for those media assets that have transmission times that overlap with retrieved events. Step 504 and part of step 506 of process 500 are further exemplified by process 800 of FIG. 8.

At step 802, the media guidance application retrieves (e.g., via control circuitry 304) from the database, database entries corresponding to the plurality of events and database entries corresponding to a first plurality of media assets. It should be noted that both event entries and media asset entries may reside in the same database. Alternatively, event entries may reside in one database and media asset entries may reside in another database. It should also be noted that event entries and media asset entries may reside in files (e.g., XML files) or other appropriate data structures. The database may be stored locally (e.g., in storage 308) on the device where the media guidance application resides. Additionally or alternatively, the database may be stored at media content source 416 and/or media guidance data source 418.

At step 804, the media guidance application determines (e.g., via control circuitry 304) whether all database entries corresponding to the plurality of events have been previously selected. If all the database entries corresponding to the plurality of events have been previously selected, process 800 moves to step 808 and ends. If all the database entries corresponding to the plurality of events have not previously been selected, process 800 moves to step 806. At step 806, the media guidance application selects (e.g., via control circuitry 304) a previously unselected database entry corresponding to an event of the plurality of events. For example, the database entries corresponding to the plurality of events may be stored in RAM after they have been retrieved from the database. These entries may be stored in a data structure such as an array. The media guidance application may iterate through the array to select each entry for processing.

At step 810, the media guidance application retrieves (e.g., via control circuitry 304) an event start time and an event end time from the selected database entry corresponding to the event. As described above in connection with step 806, the database entry may be stored in RAM after being retrieved from the database. The media guidance application may access the entry in memory and extract the different fields associated with the database entry. The media guidance application may then retrieve the data in the fields corresponding to an event start time and an event end time.

At step 812, the media guidance application determines (e.g., via control circuitry 304) whether all the database entries corresponding to the first plurality of media assets have been previously selected. If all the database entries corresponding to the first plurality of media assets have been previously selected, process 800 moves to step 804. Otherwise, process 800 moves to step 814.

At step 814, the media guidance application selects (e.g., via control circuitry 304) a previously unselected database entry corresponding to a media asset of the first plurality of media assets. At step 816, the media guidance application retrieves (e.g., via control circuitry 304) a media asset start time and a media asset end time from the selected database entry corresponding to the media asset. The media guidance application may perform the retrieval operation in the same manner as discussed in relation to step 810.

At step 818, the media guidance application may compare (e.g., via control circuitry 304) the event start time with the media asset start time and media asset end time to determine with which media assets the selected event overlaps. For example, if the start time of the event falls between the start time and the end time of the media asset transmission, the media guidance application may determine that the event overlaps with the media asset.

At step 820, the media guidance application compares the event end time with media asset start time and media asset end time to determine with which media assets the selected event overlaps. For example, if the end time of the event falls between the start time and the end time of the media asset transmission, the media guidance application may determine that the event overlaps with the media asset. Thus, the media guidance application may detect an overlap when either an overlap is found in step 818 or step 820, or both. It should be noted that the media guidance application may be enabled to take into account the time zones associated with the transmission times of the media assets and the events when detecting overlaps. For example, the user's usual time zone may be the Eastern Time Zone. However, the user may be traveling and may be located in the Pacific Time Zone. When the media guidance application compares the event start times and end times with the media asset start times and end times, the media guidance application may first transform the start times and the end times into one time zone (e.g., Greenwich Mean Time). Thus, when the second plurality of media asset identifiers is displayed, the overlaps are correctly indicated regardless of what time zone the user is in.

At step 822, the media guidance application determines (e.g., via control circuitry 304) whether either the event start time or event end time falls between the media asset start time and media asset end time. If neither the event start time nor the event end time fall between the media asset start time and media asset end time, process 800 moves to step 804. Otherwise, process 800 moves to step 824.

At step 824, the media guidance application updates (e.g., via control circuitry 304) the selected database entry corresponding to the media asset with (1) data from the database entry corresponding to the event and (2) a conflict indicator. The media guidance application may perform the update by overwriting all the data in the database entry with the event data. Alternatively, the media guidance application may overwrite only the portions of the database entry that have changed. When the media guidance application completes the update, process 800 moves to step 804 where another previously unselected event is selected for processing.

Figure 8:
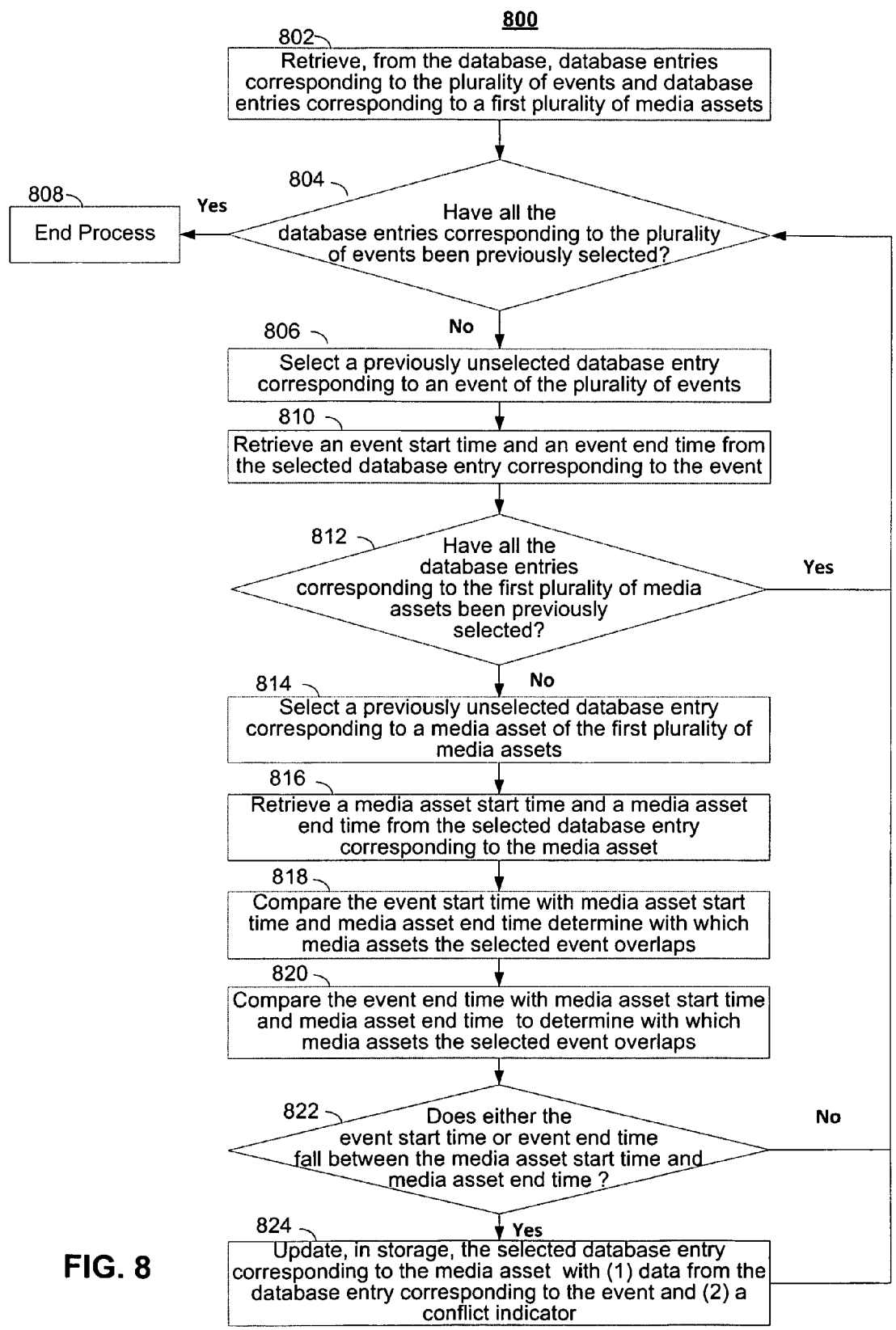
FIG. 8 depicts an illustrative process involved in identifying media assets that overlap with calendar events, in accordance with some embodiments of this disclosure.

It is contemplated that the descriptions of FIG. 8 may be used with any other embodiment of this disclosure. In addition, steps of process 800 may be performed in alternative orders or in parallel to further the purposes of this disclosure. For example, the media guidance application may use multiple logical processor threads or physical processors in order to increase performance. Furthermore, process 800 may be enhanced by incorporating branch prediction. It should be noted that process 800 may be implemented on a combination of appropriately configured software and hardware, and that any of the devices or equipment discussed in relation to FIGS. 3-4 may be used to implement one or more portions of the process.

FIG. 9 illustrates possible pseudo-code that may be used to implement process 800. It will be evident to one skilled in the art that pseudo-code of FIG. 9 may be implemented in any number of programming languages and on a variety of different hardware, and that the style and format should not be construed as limiting, but rather a general template of the steps and procedures that would be consistent with code used to implement process 800.

At line 902, the media guidance application executes (e.g., via control circuitry 304) a subroutine to initialize variables and prepare to start the routine to compare media asset entries with event entries. For example, the media guidance application may copy (e.g., via control circuitry 304) instructions from a non-transitory storage medium (e.g., storage device 308) into RAM or into the cache for processing circuitry 306. The media guidance application may execute the initialization subroutine in response to routine 700 finishing.

At line 905, the media guidance application executes a function to retrieve calendar events. The function can take as input a server name (e.g., a server associated with media content source 416 and/or media guidance data source 418. Alternatively, the media guidance application may retrieve the calendar events from storage 308 on the device where the media guidance application resides. In those instances, a server name is not provided to the function. The media guidance application may perform the function in any manner described in connection with process 800.

At line 906, the media guidance application executes (e.g., via control circuitry 306) a function to retrieve media asset entries. The function may take as input a server name in the instances where the media asset entries are retrieved from a remote server. For example, the media asset entries may be retrieved from a server associated with media content source 416 and/or media guidance data source 418. Additionally or alternatively, the media guidance application may retrieve the media asset entries from storage 308 on the device where the media guidance application resides. In some instances, the device where the media guidance application resides may store media asset entries for a specific time period and a remote server (e.g., a server associated with media content source 416 and/or media guidance data source 418) may store media asset entries for a longer period. Thus, the media guidance application may retrieve the media asset entries from both locations. For example, the media asset entries for the next week may be stored on the device where the media guidance application resides and the server may store entries up to one month ahead.

At line 907, the media guidance application executes (e.g., via control circuitry 304) a "For loop" that iterates every event entry. At line 908, the media guidance application executes (e.g., via control circuitry 304) a function to retrieve a start time of the event entry that is currently being processed. At line 909, the media guidance application executes (e.g., via control circuitry 304) a function to retrieve an end time of the event entry that is currently being processed. It should be noted that both retrieval operations may be performed in any manner as described in relation to process 800 of FIG. 8.

At line 910, the media guidance application executes a second "For loop" that iterates through each media asset entry. At line 911, the media guidance application executes (e.g., via control circuitry 304) a function to retrieve a start time associated with the media asset entry that is being processed. At line 912, the media guidance application executes (e.g., via control circuitry 304) a function to retrieve an end time associated with the media asset entry that is currently being processed. It should be noted that both retrieval operations may be executed in any manner described in relation to process 800 of FIG. 8.

At line 913, the media guidance application determines (e.g., via control circuitry 304) whether the event start time falls between the media asset start time and the media asset end time. If event start time falls between the media asset start time and the media asset end time, the media guidance application, at line 914, executes (e.g., via control circuitry 304) a function to update the media asset entry with the data from the event entry. The media guidance application may update the media asset entry with data such as the start time of the event, the end time of the event, description, reminder information, subject, etc.

At line 915, the media guidance application executes (e.g., via control circuitry 304) a function to update the media asset entry with a new conflict indicator. For example, the media guidance application may update the media asset entry with a pointer to a conflict indicator that is stored in a different table in a database. Additionally or alternatively, a pointer to an event entry may server as a conflict indicator. In this instance, the media guidance application does not have to store the data from the event entry in the media asset entry, but instead point to the event entry in a different part of a database or in another database. As a result, less storage would be used to store the media asset entry.

At line 917, the media guidance application determines (e.g., via control circuitry 304) whether the event end time falls between the media asset start time and the media asset end time. If event end time falls between the media asset start time and the media asset end time, the media guidance application, at line 918, executes (e.g., via control circuitry 304) a function to update the media asset entry with the data from the event entry. The media guidance application may update the media asset entry with data such as the start time of the event, the end time of the event, description, reminder information, subject, etc.

At line 919, the media guidance application executes (e.g., via control circuitry 304) a function to update the media asset entry with a new conflict indicator. For example, the media guidance application may update the media asset entry with a pointer to a conflict indicator that is stored in a different table in a database. Additionally or alternatively, a pointer to an event entry may server as a conflict indicator. In this instance, the media guidance application does not have to store the data from the event entry in the media asset entry, but instead point to the event entry in a different part of a database or in another database. As a result, less storage would be used to store the media asset entry.

At line 921, the media guidance application moves to the next step of the Inner For loop and at line 922 the media guidance application moves to the next step of the Outer For Loop. The media guidance application proceeds to terminate (e.g., via control circuitry 304) the process, as indicated at line 924. For example, the media guidance application may clean up memory and destruct variables no longer needed.

It should be noted that pseudo-code in FIG. 9 may be implemented in any number of programming languages and on a variety of different hardware, and the particular choice and location of primitive functions, logical evaluations, and function evaluations are not intended to be limiting. It should also be noted that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 10:
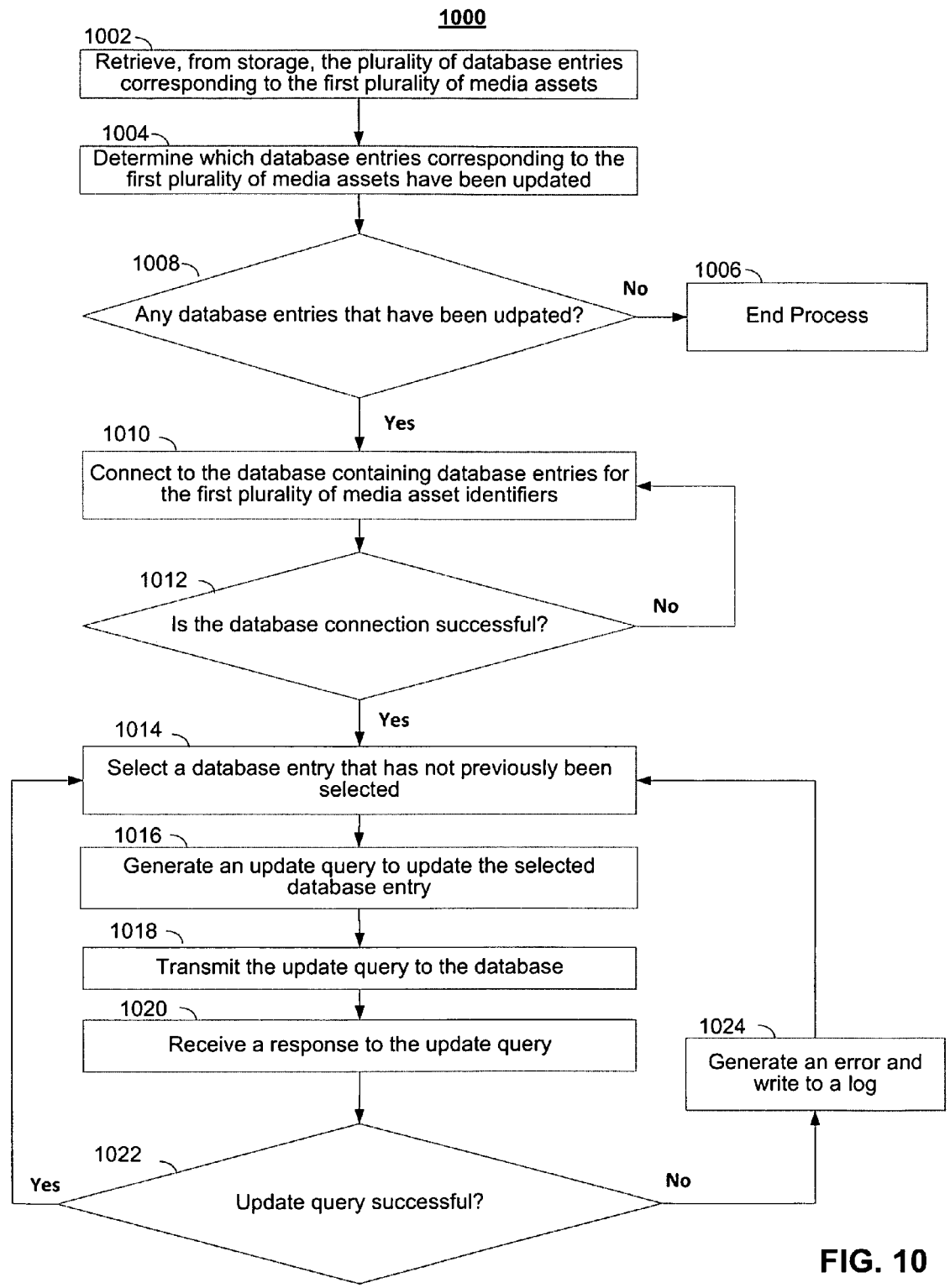
FIG. 10 depicts an illustrative process involved in storing conflict indicators with appropriate media asset identifier database entries, in accordance with some embodiments of this disclosure.

Process 1000 of FIG. 10 exemplifies another portion of step 506. Specifically, process 1000 illustrates steps that may be used by the media guidance application to update, in the database, database entries that have been updated by process 800 of FIG. 8. At step 1002, the media guidance application retrieves (e.g., via control circuitry 304) from storage the plurality of database entries corresponding to the first plurality of media assets. The media guidance application may retrieve from storage the stored entries that resulted from executing process 800 of FIG. 8.

At step 1004, the media guidance application determines (e.g., via control circuitry 304) which database entries corresponding to the first plurality of media assets have been updated. The media guidance application may make the determination by accessing an update flag of each database entry in memory. It should be noted that many current programming packages include routines that automatically set an update flag on database entries in memory that have been updated by certain routines.

At step 1008, the media guidance application determines whether any database entries have been updated. If no database entries have been updated process 1000 moves to step 1006 where it ends. If at least one database entry has been updated process 1000 moves to step 1010. It should be noted that steps 1004 and 1008 may be performed in parallel or combined into one step. For example, the media guidance application may iterate through each database entry and store in memory a flag if at least one database entry is found that has been updated. When a first updated database entry is found, the media guidance application may terminate the search and determine that at least one database entry has been updated. Alternatively, the media guidance application may search through all the database entries and create a data structure (e.g., an array) that includes pointers to each database entry that has been updated. The media guidance application may then determine if the array has any pointers. If the array has pointer then updated database entries have been found. If no pointers are present in the array, then no database entries have been updated.

At step 1010, the media guidance application connects (e.g., via control circuitry 304 through I/O path 302) to the database containing database entries for the first plurality of media asset identifiers. For example, the media guidance application may transmit (via I/O path 302) to a database a connection request. It should be noted that the database may be located at media content source 416 and/or media guidance data source 418, which may be accessed through communications network 414. Alternatively, the database may reside at any location accessible over the Internet or another network.

At step 1012, the media guidance application determines (e.g., via control circuitry 304) whether the database connection has been successful. The media guidance application may make that determination by analyzing a response from the database to the connection request from step 1010. If the media guidance application is unsuccessful in connecting to the database, process 1000 moves to step 1010. At step 1010, the media guidance application may make another connection attempt. It should be noted that any number of connection attempts may be made before the media guidance application determines that the database is unavailable and will wait a specific amount of time before attempting to connect again. The media guidance application may alert the user and/or save the data associated with the connection failure(s) to a log file. If the database connection is successful, process 1000 moves to step 1014.

At step 1014, the media guidance application selects for processing (e.g., via control circuitry 304) a database entry that has not previously been selected. At step 1016, the media guidance application generates an update query to update the selected database entry. The query may include specific Application Programming Interface ("API") calls that are compatible with the database being updated in order to generate the update query. At step 1018, the media guidance application transmits (e.g., via control circuitry 304 through I/O Path 302) the update query to the database. At step 1020, the media guidance application receives a response from the database to the update query and in step 1022 determines whether the update was successful or not. If the update is successful, process 1000 moves to step 1014. Otherwise, process 1000 moves to step 1024 where the media guidance application generates (e.g., via control circuitry 304) an error and writes it to a log. It should be noted that the log may reside on the same device as the media guidance application may be stored in storage 308. Additionally or alternatively, the error log may reside at media content source 416 and/or media guidance data source 418.

It is contemplated that the descriptions of FIG. 10 may be used with any other embodiment of this disclosure. In addition, steps of process 1000 may be performed in alternative orders or in parallel to further the purposes of this disclosure. For example, the media guidance application may use multiple logical processor threads or physical processors in order to increase performance. Furthermore, process 1000 may be enhanced by incorporating branch prediction. It should be noted that process 1000 may be implemented on a combination of appropriately configured software and hardware, and that any of the devices or equipment discussed in relation to FIGS. 3-4 may be used to implement one or more portions of the process.

FIG. 11 illustrates possible pseudo-code that may be used to implement process 1000. It will be evident to one skilled in the art that pseudo-code of FIG. 11 may be implemented in any number of programming languages and on a variety of different hardware, and that the style and format should not be construed as limiting, but rather a general template of the steps and procedures that would be consistent with code used to implement process 1000.

At line 1102, the media guidance application executes (e.g., via control circuitry 304) a subroutine to initialize variables and prepare to start the routine to receive an emergency alert. For example, media guidance application may copy (e.g., via control circuitry 304) instructions from a non-transitory storage medium (e.g., storage device 308) into RAM or into the cache for processing circuitry 306. The media guidance application may execute the initialization subroutine in response to routine 900 finishing.

At line 1105 the media guidance application executes (e.g., via control circuitry 304) a function to retrieve media asset entries. The media guidance application may retrieve the media asset entries by any method described in connection with process 1000 of FIG. 10. At line 1106, the media guidance application executes (e.g., via control circuitry 304) a function to detect which media asset entries have been updated as part of process 800. The media guidance application may store pointers to those database entries in an array or another appropriate data structure.

At line 1107 the media guidance application determines whether any entries have been updated. If no entries have been updated the media guidance application executes (e.g., via control circuitry 304) a termination subroutine. The termination subroutine may be similar to a termination subroutine as described in relation to FIG. 9. If the media guidance application determines that at least one media asset entry has been updated, the media guidance application proceeds to line 1109 where the "if" statement ends. At line 1110 the media guidance application sets (e.g., via control circuitry 304) a status variable to zero.

At line 1111 the media guidance application executes (e.g., via control circuitry 304) a while loop that will iterate until the status variable is set to a value other than zero. At line 1112, the media guidance application executes (e.g., via control circuitry 304) a function to connect to the database. If the function is successful, then the status variable is set to a number other than zero. It should be noted that more pseudo-code may be added in order to stop connection attempts after a certain number of tries. Other pseudo-code may be added to stop connection attempts for a specific amount of time before resuming. That pseudo-code has not been included in order to keep FIG. 11 focused on the specific steps of updating the database. At line 1113, the media guidance application executes (e.g., via control circuitry 304) the next step of the while loop.

When the database connection has been successful, the media guidance application, at line 1114, executes "For loop" to iterate through each updated entry in order to transmit the update to the database. At line 1115, the media guidance application executes (e.g., via control circuitry 304) a function to generate a query to update the database with the current entry that is being processed. When the query is created, it is transmitted to the database, at line 1116. At line 1117, the media guidance application determines (e.g., via control circuitry 304) if the update was successful. If the update is not successful, the media guidance application executes (e.g., via control circuitry 304) a function to write an error to a log file. The error may include any information related to why the error occurred. At line 1119, the "if" statement ends. At line 1120, the media guidance application moves to the next step of the "For loop." At line 1122, the media guidance application executes a termination subroutine. For example, the media guidance application may clean up memory and destruct variables no longer needed.

It should be noted that pseudo-code in FIG. 11 may be implemented in any number of programming languages and on a variety of different hardware, and the particular choice and location of primitive functions, logical evaluations, and function evaluations are not intended to be limiting. It should also be noted that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

As discussed above, in step 508 of process 500, the media guidance application generates for display (e.g., via control circuitry 304) a second plurality of media assets. Process 1200 of FIG. 12 exemplifies specific steps that the media guidance application may use in step 508 of process 500. At step 1202, the media guidance application determines (e.g., via control circuitry 304) a time period and one or more content sources for which media asset identifiers need to be displayed. For example, the media guidance application may have received an input (e.g., from user input interface 31) indicating that a user wants to look at scheduling information for channels 1 through 5 between 5:00 PM and 7:00 PM. In response, the media guidance application may determine that a display screen with channels 1 through 5 between 5:00 Pm and 7:00 PM has to be displayed.

At step 1204, the media guidance application searches (e.g., via control circuitry 304) for a second plurality of media asset identifiers based on the time period and the one or more content sources. For example, the media asset identifiers may be stored in a database. The media guidance application may create a query that includes the time interval (e.g., from 5:00 PM to 7:00 PM) and the content sources (e.g., channel 1 through 5) as search parameters. The media guidance application may perform the search against media asset identifiers in storage 308 of the device where the media guidance application resides. Alternatively or additionally, the media guidance application may search for the media asset identifiers in media content source 416 and/or media guidance data source 418. For example, in the instances where the media guidance application does not find any media asset identifiers that fit the search criteria in storage 308, the media guidance application may perform the search against media content source 416 and/or media guidance data source 418.

At step 1206, the media guidance application determines (e.g., via control circuitry 304) whether at least one media asset identifier has been identified as a result of the search. If no media asset identifiers have been identified as a result of the search, process 1200 moves to step 1208. At step 1208, the media guidance application generates for display (e.g., via control circuitry 304) a message to a user informing the user that no media asset identifiers meet the search criteria (e.g., in the instances where the user has chosen a time period and channels where nothing is transmitted). If at least one media asset identifier is found, process 1200 moves to step 1210. At step 1210, the media guidance application determines (e.g., via control circuitry 304) whether any more media asset identifiers are left that have not previously been selected. If all the media asset identifiers have previously been selected, process 1200 moves to step 1212 where it ends. If at least one media asset identifier has not been previously selected, process 1200 moves to step 1214.

At step 1214, the media guidance application selects (e.g., via control circuitry 304) a media asset identifier from the second plurality of media asset identifiers that has not previously been selected. At step 1216, the media guidance application retrieves (e.g., via control circuitry 304) a media asset database entry corresponding to the selected media asset identifier. The media guidance application may perform the retrieval operation by generating a query to the database that includes a specific ID of the media asset identifier. At step 1218, the media guidance application determines (e.g., via control circuitry 304) whether the retrieved media asset database entry includes a conflict indicator. If the media guidance application determines that no conflict indicator is included in the media asset database entry, process 1200 moves to step 1220, where the media guidance application generates for display (e.g., via control circuitry 304 on display 312) the media asset identifier. For example, the media guidance application may send the data associated with the media asset database entry to a renderer in the same device that can render the information on the display (e.g., display 312). Process 1200 then moves to step 1210. However, if the media asset database entry includes a conflict indicator, process 1200 moves to step 1222.

At step 1222, the media guidance application identifies (e.g., via control circuitry 304) a visual indicator corresponding to the conflict indicator. For example, different visual indicators may be available to the media guidance application. In some instances, the media guidance application may store as part of the conflict indicator a link to the corresponding visual indicator. In some instances, the visual indicator may be stored in the media asset database entry, and the media guidance application may retrieve it.

At step 1124, the media guidance application generates for display (e.g., via control circuitry 304 on display 312) the selected media asset identifier with the visual indicator. Process 1200 then moves to step 1210.

Figure 12:
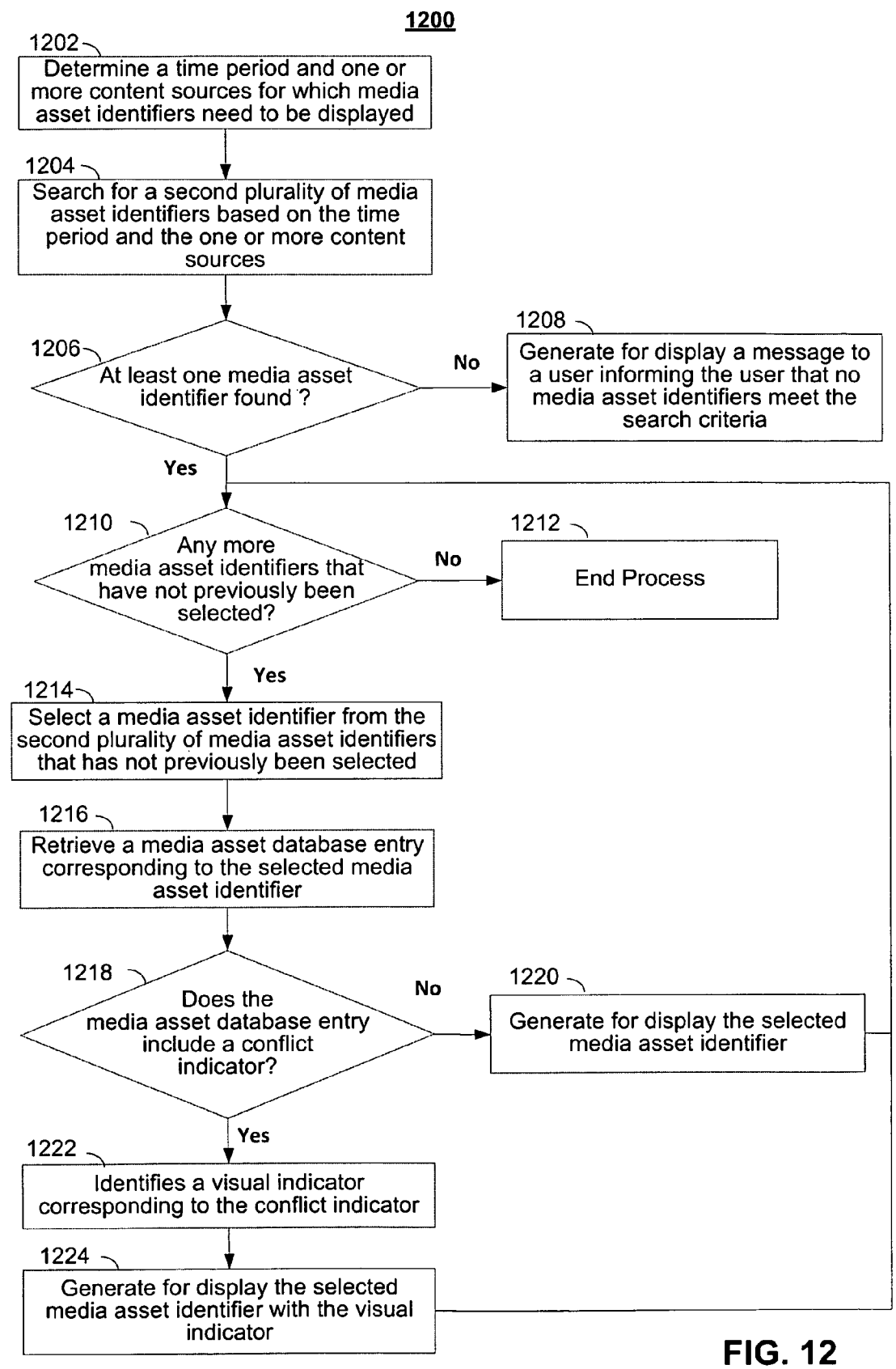
FIG. 12 depicts an illustrative process involved in generating for display media asset identifiers while visually distinguishing media asset identifiers that correspond to media assets that overlap with a user's calendar events, in accordance with some embodiments of this disclosure.

It is contemplated that the descriptions of FIG. 12 may be used with any other embodiment of this disclosure. In addition, steps of process 1200 may be performed in alternative orders or in parallel to further the purposes of this disclosure. For example, the media guidance application may use multiple logical processor threads or physical processors in order to increase performance. Furthermore, process 1200 may be enhanced by incorporating branch prediction. It should be noted that process 1200 may be implemented on a combination of appropriately configured software and hardware, and that any of the devices or equipment discussed in relation to FIGS. 3-4 may be used to implement one or more portions of the process.

FIG. 13 illustrates possible pseudo-code that may be used to implement process 1200. It will be evident to one skilled in the art that pseudo-code of FIG. 13 may be implemented in any number of programming languages and on a variety of different hardware, and that the style and format should not be construed as limiting, but rather a general template of the steps and procedures that would be consistent with code used to implement process 1200.

At line 1302, the media guidance application executes (e.g., via control circuitry 304) a subroutine to initialize variables and prepare to start the routine to receive an emergency alert. For example, media guidance application may copy (e.g., via control circuitry 304) instructions from a non-transitory storage medium (e.g., storage device 308) into RAM or into the cache for processing circuitry 306. The media guidance application may execute the initialization subroutine in response to routine 1100 finishing.

At lines 1305 and 1306, the media guidance application retrieves (e.g., via control circuitry 304) a time period and content sources to be displayed. As discussed in relation to FIG. 12, the time period and the content sources may be requested by a user. At line 1307, the media guidance application executes (e.g., via control circuitry 304) a function to create a query to search for media asset identifiers that need to be displayed. At line 1308, the media guidance application executes (e.g., via control circuitry 304) a function to query the database for the requested media asset identifiers. The query may be created in the same manner as described in related to FIG. 12. In response to the query, the media guidance application may return the media asset identifiers that match the query. The media guidance application may store the media asset identifiers in an array or another appropriate data structure.

At line 1309, the media guidance application determines (e.g., via control circuitry 304) whether the array includes any data. If the array does not include any data, then the media guidance application executes a termination subroutine at line 1322. If the array includes at least some data, the media guidance application, at line 1310, executes (e.g., via control circuitry 304) a "for loop" that iterates through each found media asset identifier.

At line 1311, the media guidance application executes (e.g., via control circuitry 304) a function to retrieve the data associated with the database entry and stores the data in a variable. At line 1312, the media guidance application determines (e.g., via control circuitry 304) whether the data includes a conflict indicator. If no conflict indicator is included, the data is added to the display to be rendered. If a conflict indicator is included in the data, the media guidance application, at line 1313, executes (e.g., via control circuitry 304) a function to find and retrieve a visual indicator associated with the conflict indicator. The media guidance application may perform this operation in any manner described in relation to FIG. 12. At line 1314, the media guidance application executes (e.g., via control circuitry 304) a function to add the media asset identifier and the indicator to the screen to be displayed. At line 1318, the media guidance application executes (e.g., via control circuitry 304) the next step of the "for loop." At line 1319, the media guidance application executes (e.g., via control circuitry 304) a function to render the data for display. At line 1322, the media guidance application executes a termination subroutine. For example, the media guidance application may clean up memory and destruct variables no longer needed.

It should be noted that pseudo-code in FIG. 13 may be implemented in any number of programming languages and on a variety of different hardware, and the particular choice and location of primitive functions, logical evaluations, and function evaluations are not intended to be limiting. It should also be noted that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

In some embodiments, the media guidance application may enable the user to visually distinguish media assets that overlap with events of different priorities. Specifically, the media guidance application may determine a first priority of a first event of the plurality of events that overlaps at least in part with a transmission time of a first media asset corresponding to a first media asset identifier in the first portion. For example, the calendar data may have priority data that the media guidance application retrieves from the calendar application. The media guidance application may determine the priority of the event by simply accessing an event database entry for a particular event. Additionally or alternatively, the media guidance application may determine a priority of each event based on keywords that are part of the event. For example, the media guidance application may have access to a set of keywords that if matched may elevate an event to a high priority. The media guidance application may match every word in the event database entry against the keywords to determine whether any keywords match. In some embodiments, if one keyword matches, the event may be designated as a high priority event.

In other embodiments, a threshold number of words must match in order for an event to be elevated to a high priority event. The threshold may be set by the user or by an administrator of the system. In some embodiments, each keyword may be associated with a weight and a threshold value may be a weighted value. Thus, if enough keywords with appropriate weight values match, the event may be elevated to a high priority event.

The media guidance application may, determine a second priority of a second event of the plurality of events that overlaps at least in part with a transmission time of a second media asset corresponding to a second media asset identifier in the first portion. The second priority may be determined in exactly the same manner as the first priority.

The media guidance application may visually distinguish the first media asset identifier in the first portion from the second media asset identifier in the first portion based on the first priority being different from the second priority. For example, the media guidance application may render the media asset identifiers associated with a high priority in red and a lower priority in green.

In some embodiments, different visual indicators may be associated with different priorities and the media guidance application may enable a user to visually distinguish the media assets that overlap with different priority events via different visual indicators. Specifically, the media guidance application may store a first visual indicator associated with the first priority and a second visual indicator associated with the second priority. The media guidance application may store these indicators in the database table together with the corresponding priorities. The media guidance application may generate for display the first media asset identifier with the first visual indicator and the second media asset identifier with the second visual indicator.

Figure 14:
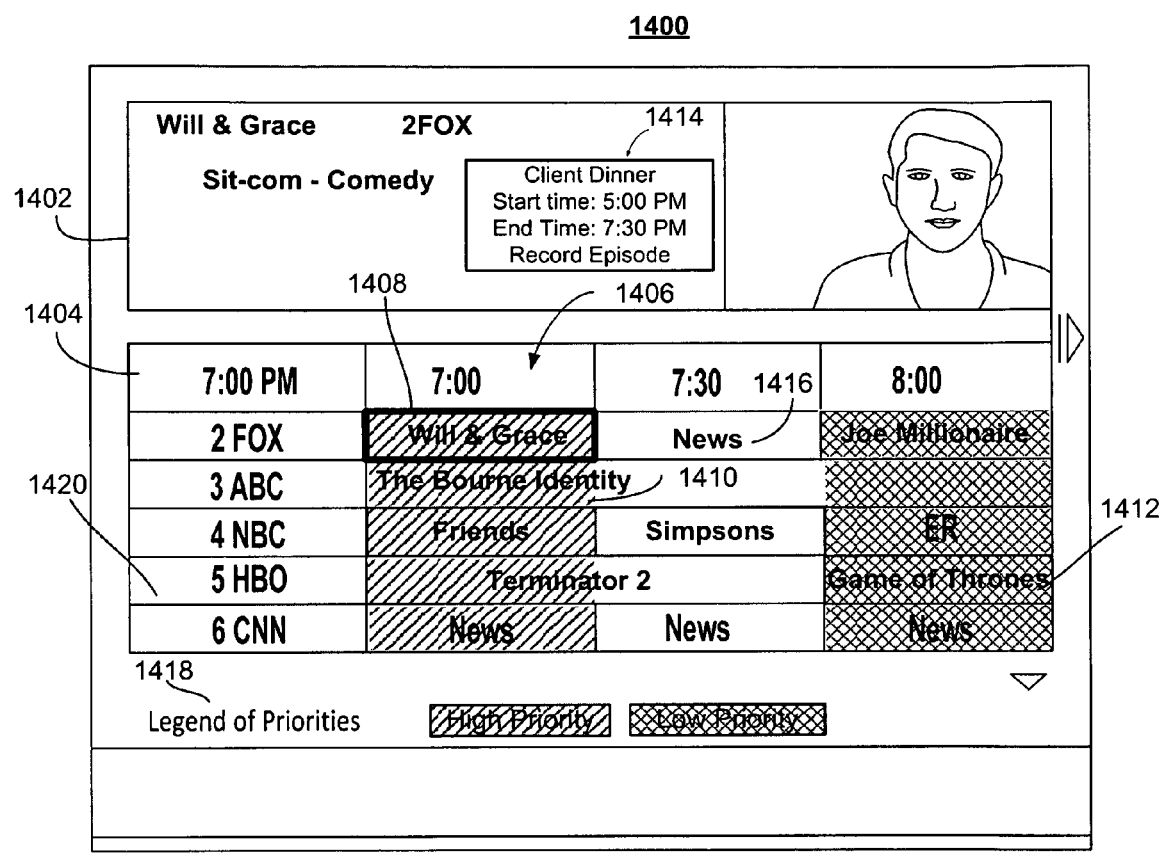
FIG. 14 depicts an illustration of a screen where media asset identifiers that correspond to media assets that overlap with a user's calendar events visually distinguished from media asset identifiers that correspond to media assets that do not overlap with the user's calendar events, in accordance with some embodiments of this disclosure.

FIG. 14 exemplifies one possible display that includes different visual indicators for different priorities. Area 1404 of display 1400 includes a grid display of different time periods on horizontal scale 1406 and channel numbers on vertical axis 1420. Media asset identifier 1412 corresponding to "Game of Thrones" is shaded in one manner to indicate to the user that "Game of Thrones" overlaps with a Low Priority event. Media asset identifier 1408 is visually distinguished from media asset identifier 1412 via different shading. In this instance media asset identifier 1408 corresponds to a media asset that overlaps with a High Priority event. Media asset identifier 1410 is also shaded to indicate overlap with a high priority event. However, only part of media asset identifier 1410 is shaded in order to indicate to the user that only part of this media asset identifier overlaps with an event. Media asset identifier 1416, representing the "News," is not shaded in order to indicate that the media asset associated with this media asset identifier does not overlap with any events. Legend 1418 indicates to the user the meaning of each type of shading. It should be noted that different shadings may be used for different priorities. It should also be noted that other priorities are possible to include in FIG. 14 with different shadings. It should also be noted that instead of shading the media asset identifiers in a particular way, the media asset identifiers may be of different colors (e.g., red for overlaps with high priority events, green for overlaps with low priority events, and blue for no overlaps).

Area 1402 provides more information on the currently selected media asset 1408 "Will and Grace." Inside of area 1402, area 1414 indicates some details about the event "Will and Grace," specifically, the description of the event, start time and end time. It should also be noted that because "Will and Grace" overlaps with a High priority event an option to reschedule the event is not present. Instead, an option to record the media asset is available to the user inside of area 1414.

In some embodiments, as described in FIG. 14, the media guidance application may enable a user to reschedule an overlapping event. Specifically, the media guidance application may assign the first priority to those events of the plurality of events that may be rescheduled and the second priority to those events of the plurality of events that may not be rescheduled. In response to a user selection of the first media asset identifier, the media guidance application may generate for display calendar data associated with the first event and provide an option to a user to reschedule the first event. If the user selects the option to reschedule the overlapping event, the media guidance application may generate for display a form that may include the details of the event (e.g., start time, end time, description, subject, reminder information, etc.). The media guidance application may enable the user to edit the information. Once the user has finished editing the information, the user may submit the edited form. The media guidance application may receive an indication from the user (e.g., by a user selecting a submit option) that the user has finished editing the event. The media guidance application may then transmit the edited event to the calendar application and update a database of media asset identifier to remove a conflict indicator from the appropriate media asset identifier.

In response to a user selection of the second media asset identifier, the media guidance application may generate for display calendar data associated with the second event and provide an option to the user to record the second media asset. The media guidance application may generate for display one or more options to record the media asset or record a series the media asset is associated with, if the media asset is indeed a part of a series.

In some embodiments, the media asset guidance application may generate for display, in area 1404, information about a series of media assets and include overlap information in the display. As referred to herein, the term "series" refers to a plurality of media assets that share a common characteristic. For example, the media guidance application may generate for display media asset identifiers corresponding to media assets associated with a series (e.g., media asset identifiers corresponding to games one through seven of the NBA Finals. In this instance, the media guidance application may generate for display, with each game that overlaps with at least one event, a visual indicator that visually distinguishes those games from games that do not overlap with events. In some embodiments, the media guidance application may generate for display details of the overlapping event in response to a user selecting one of the displayed media asset identifiers that corresponds to a media asset that overlaps with at least one event.

In some embodiments, the media guidance application may assign a third priority (e.g., a medium priority) to some events. For example, medium priority events may be those events where they can be moved under certain circumstances. For media asset identifiers that correspond to media assets that overlap with medium priority events, the media guidance application may provide (e.g., generate for display) an option to the user to transmit a rescheduling request to other participants of the event. The media guidance application may further receive from the other participants a response as to whether a rescheduling request is acceptable.

If all the other participants agree, the media guidance application may proceed to reschedule the event and notify the user of the change. If all the participants do not agree, the media guidance application may not reschedule the event.

In some embodiments, the media asset identifiers in the first portion are visually distinguished from the media asset identifiers in the second portion by a first type of an indicator and the first media asset identifier is visually distinguished from the second media asset identifier with a second type of an indicator. For example, the media asset identifiers in the first portion (i.e., that correspond to media, assets that overlap with at least one event) may be distinguished by a different color from the media asset identifiers in the first portion (e.g., red versus blue). In addition, the media asset identifiers that correspond to media assets that overlap with high priority events may include an icon denoting that the media asset identifier corresponding to media assets that overlap with low priority event may not have an icon or may have a different icon. Examples of types of indicators may include colors, shadings, icons, textual indications.

In some embodiments, the media guidance application may, when comparing the event time intervals of the plurality of events with the media asset time intervals of the first plurality of media assets, perform the following steps. The media guidance application may retrieve, for a first event in the plurality of events, a first start time and a first end time. For example, the first event may be stored in a database, storage 308, on the same device on which the media guidance database resides. Additionally or alternatively, the first event may be stored in a different location (e.g., at media content source 416 and/or media guidance data source 418). In those instances, the media guidance application may retrieve the first event from the remote sources via a network (e.g., communications network 414).

The media guidance application may retrieve, for a first media asset in the first plurality of media assets, a second start time and a second end time. The first media asset may be retrieved from the same locations as the first event. It should be noted that both events and media asset identifier may be stored in the same database or different databases. The media guidance application may compare the first start time with the second start time and the second end time and compare the first end time with the second start time and the second end time. The media guidance application may make a straight mathematical comparison between dates and times in order to determine whether an overlap exists. Based on determining that the first start time or the first end time falls between the second start time and the second end time, the media guidance application may generate a first conflict indicator for the first media asset. The first conflict indicator may be generated by determining the priority of the overlapping event and a designated indicator for that priority. As described above, the conflict indicator may include a pointer to the event.

In some embodiments, the media guidance application may enable a user to create an event based on a media asset transmission time of a media asset that the user desires to consume. Specifically, in response to a user selection of a first media asset identifier in the first portion, the media guidance application may generate for display an option to create a new event corresponding to a first media asset associated with the first media asset identifier. In response to a user selection of the option, the media guidance application may create the new event having an event start time and an event end time corresponding to a media asset start time and media asset end time of the first media asset, respectively. For example, the media guidance application may generate for display a form that a user may edit in order to create a new event. The form may be prefilled with a start time of the media asset, the end time of the media asset, and the title, along with other appropriate information. When the user finishes editing the form, the media guidance application may receive a user input to create the event. The media guidance application may transmit the new event to the calendar application.

In some embodiments, the media guidance application may enable a user to invite another user to consume a media asset scheduled for a future time. Specifically, the media guidance application may receive, from the calendar application, calendar data for a plurality of events associated with a different user, where the calendar data associated with the different user includes event time intervals having associated event start times and end times. The media guidance application may retrieve the calendar data in the same manner as described in relation to FIG. 6.

In response to a user selection of a first media asset identifier in the first portion of the second plurality of media assets, the media guidance application may determine whether a transmission time of a media asset associated with the first media asset identifier overlaps at least in part with at least one of the event time intervals associated with the different user. The media guidance application may make the determination in the same manner as described in relation to FIGS. 8 and 10. Based on determining that the media asset associated with the first media asset identifier does not overlap at least in part with at least one of the event time intervals associated with the different user, the media guidance application may generate for display an option to invite the different user to consume the media asset associated with the first media asset identifier. When the user selects the option, the media guidance application may determine a means to communicate with the different user. For example, the media guidance application may prompt the user for the different user's email address or a social network user name. The media guidance application may then transmit a message to the email address or the different user's social network account.

In some embodiments, the media guidance application may enable the user to determine which of the user's social networking friends are scheduled to consume or record a specific media asset. Specifically, the media guidance application may retrieve, from a server associated with a social networking application, a plurality of user identifiers associated with friends of the user. For example, the media guidance application may prompt the user to enter the user's social networking authentication information. Additionally or alternatively, the media guidance application may have the user's social networking credentials already stored (e.g., in storage 308). The media guidance application may be configured to prompt for the user's social networking credentials during initial setup.

The media guidance application may retrieve, for each user identifier in the plurality of user identifiers, calendar data for a plurality of events associated with each friend, where the calendar data includes event time intervals having associated event start times and end times. The media guidance application may retrieve the calendar data by any process described in FIG. 6. Furthermore, the media guidance application may determine the friends' email addresses by accessing the social networking application. The media guidance application may then use the friends' email addresses to access the friends' calendar data.

In response to a user selection of a first media asset identifier in the second plurality of media asset identifiers, the media guidance application may generate for display one or more user identifiers associated with those friends of the user that are scheduled to consume a media asset corresponding to the first media asset identifier. For example, the media guidance application may generate for display the friends' usernames from the social networking application. Additionally or alternatively the media guidance application may generate for display the friends' pictures as retrieved from the social networking application.

In some embodiments, the media guidance application may be configured to remove overlaps in the instances when the user has cancelled a specific event. Periodically, the media guidance application may retrieve, from the calendar application, calendar data that includes time intervals. The media guidance application may compare existing events to the retrieved events, and for any existing events that are not also included in the retrieved events, the media guidance application may remove those events from the existing events and also remove the conflict indicator from the appropriate media asset identifiers and their media asset database entries.

In some embodiments, the media guidance application may retrieve multiple calendars for a user. For example, the media guidance application may retrieve a work calendar and a personal calendar. In some instances, the events from the work calendar may be designated with a "High" priority and events from the personal calendar designated "Low" priority events.

In some embodiments, the media guidance application may provide an option for a user to schedule for consumption a media asset that overlaps with an event at a different time, if the media asset is available on demand. For example, the media guidance application may receive a user selection of a media asset identifier that corresponds to a media asset that overlaps with an event. The media guidance application may search the on-demand media assets to determine whether the media asset is available on-demand. If the media asset is available on demand, the media guidance application may generate for display an option to the user to schedule the media asset for consumption at a time the user indicates.

In some embodiments, the media guidance application may warn the user of an overlap in instances where a media asset transmission time does not overlap with an event, but may overlap with travel time to the event or from the event. For example, if a user has a 2:00 PM flight and the media asset ends at 1:45, the media guidance application may visually distinguish that media asset because the user will have to take time to travel to the airport and may need to show up at the airport a certain amount of time (e.g., two hours) prior the flight leaving. The media guidance application may analyze the event to determine the location of the event. The media guidance application may receive the location of the event from the calendar application as one of the elements associated with the event. The media guidance application may then add that time to either the start time or the end time of the event to lengthen the overlap time.

In some embodiments, the media guidance application may compare the location of the event and keywords associated with the event (e.g., the description of the event) with known event types to determine whether the user is required to arrive for the event a specific amount of time prior to the start time. For example, the media guidance application may be able to access a table that includes event types such as flight departure, train departure, etc. When the media guidance application identifies an event in the table corresponding to the event being processed by the media guidance application, the media guidance application may add that amount of time to the start time or the end time (e.g., when the user is traveling from the airport) to lengthen the overlap. It should be noted that in some instances the event will not match the type of the event in the table thus, the overlap time will not be lengthen further. The table may be stored in a database located in storage 308. Additionally or alternatively the table may be stored in a database located at media content source 416 and or media guidance data source 418.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for presenting calendaring information in a media guidance application, the method comprising:

receiving, from a calendar application, calendar data for a plurality of events associated with a user, wherein the calendar data comprises event time intervals having associated event start times and end times;

comparing the event time intervals of the plurality of events with media asset time intervals of a first plurality of media assets, wherein each media asset of the first plurality of media assets has an associated media asset start time and end time and is scheduled for transmission to a plurality of users during a corresponding media asset time interval;

based on the comparing, storing in a corresponding media asset database entry, a conflict indicator, for a first plurality of media asset identifiers corresponding to a second plurality of media assets, wherein the second plurality of media assets comprises media assets from the first plurality of media assets that have an associated media asset time interval that overlaps at least in part with at least one of the event time intervals;

generating for display a second plurality of media asset identifiers corresponding to media assets that are scheduled for transmission to the plurality of users during a time period, wherein the second plurality of media asset identifiers comprises a first portion that comprises media asset identifiers included in the first plurality of media asset identifiers and a second portion that includes media asset identifiers not included in the first plurality of media asset identifiers, and wherein the media asset identifiers in the first portion are visually distinguished from the media asset identifiers in the second portion;

determining a first priority of a first event of the plurality of events that overlaps at least in part with a transmission time of a first media asset corresponding to a first media asset identifier in the first portion;

determining a second priority of a second event of the plurality of events that overlaps at least in part with a transmission time of a second media asset corresponding to a second media asset identifier in the first portion; and visually distinguishing the first media asset identifier in the first portion from the second media asset identifier in the first portion based on the first priority being different from the second priority.

2. The method of claim 1, further comprising:
storing a first visual indicator associated with the first priority and a second visual indicator associated with the second priority; and
generating for display the first media asset identifier with the first visual indicator and the second media asset identifier with the second visual indicator.

3. The method of claim 1, further comprising:
assigning the first priority to those events of the plurality of events that may be rescheduled and the second priority to those events of the plurality of events that may not be rescheduled;
in response to a user selection of the first media asset identifier, generating for display calendar data associated with the first event and providing an option to a user to reschedule the first event; and
in response to a user selection of the second media asset identifier, generating for display calendar data associated with the second event and providing an option to the user to record the second media asset.

4. The method of claim 1, wherein the media asset identifiers in the first portion are visually distinguished from the media asset identifiers in the second portion by a first type of an indicator and the first media asset identifier is visually distinguished from the second media asset identifier with a second type of an indicator.

5. The method of claim 4, wherein types of indicators comprise colors, shadings, and icons.

6. The method of claim 1, wherein comparing the event time intervals of the plurality of events with the media asset time intervals of the first plurality of media assets comprises:
retrieving, for a first event in the plurality of events, a first start time and a first end time;
retrieving, for a first media asset in the first plurality of media assets, a second start time and a second end time;
comparing the first start time with the second start time and the second end time and comparing the first end time with the second start time and the second end time; and
based on determining that the first start time or the first end time falls between the second start time and the second end time, generating a first conflict indicator for the first media asset.

7. The method of claim 1, further comprising:
in response to a user selection of a third media asset identifier in the first portion, generating for display an option to create a new event corresponding to a third media asset associated with the third media asset identifier;
in response to a user selection of the option, creating the new event having an event start time and an event end time corresponding to a media asset start time and media asset end time of the third media asset, respectively; and
transmitting the new event to the calendar application.

8. The method of claim 1, further comprising:
receiving, from the calendar application, calendar data for a plurality of events associated with a different user, wherein the calendar data associated with the different user comprises event time intervals having associated event start times and end times;
in response to a user selection of a third media asset identifier in the first portion of the second plurality of media assets, determining whether a transmission time of a media asset associated with the third media asset identifier overlaps at least in part with at least one of the event time intervals associated with the different user; and
based on determining that the transmission time of the media asset associated with the third media asset identifier does not overlap at least in part with at least one of the event time intervals associated with the different user, generating for display an option to invite the different user to consume the media asset associated with the third media asset identifier.

9. The method of claim 1, further comprising:
retrieving, from a server associated with a social networking application, a plurality of user identifiers associated with friends of the user;
retrieving, for each user identifier in the plurality of user identifiers, calendar data for a plurality of events associated with each friend, wherein the calendar data comprises event time intervals having associated event start times and end times;
in response to a user selection of a third media asset identifier in the second plurality of media asset identifiers, generating for display one or more user identifiers associated with those friends of the user that are scheduled to consume a media asset corresponding to the third media asset identifier.

10. A system for presenting calendaring information in a media guidance application, the system comprising:
storage device;
communications circuitry; and
control circuitry configured to:
receive, from a calendar application via communications circuitry, calendar data for a plurality of events associated with a user, wherein the calendar data comprises event time intervals having associated event start times and end times;
compare the event time intervals of the plurality of events with media asset time intervals of a first plurality of media assets, wherein each media asset of the first plurality of media assets has an associated media asset start time and end time and is scheduled for transmission to a plurality of users during a corresponding media asset time interval;
based on the comparing, store, in the storage device, in a corresponding media asset database entry, a conflict indicator, for a first plurality of media asset identifiers corresponding to a second plurality of media assets, wherein the second plurality of media assets comprises media assets from the first plurality of media assets that have an associated media asset time interval that overlaps at least in part with at least one of the event time intervals;
generate for display a second plurality of media asset identifiers corresponding to media assets that are scheduled for transmission to the plurality of users during a time period, wherein the second plurality of media asset identifiers comprises a first portion that comprises media asset identifiers included in the first plurality of media asset identifiers and a second portion that includes media asset identifiers not included in the first plurality of media asset identifiers, and wherein the media asset identifiers in the first portion are visually distinguished from the media asset identifiers in the second portion;
determine a first priority of a first event of the plurality of events that overlaps at least in part with a transmission time of a first media asset corresponding to a first media asset identifier in the first portion;

determine a second priority of a second event of the plurality of events that overlaps at least in part with a transmission time of a second media asset corresponding to a second media asset identifier in the first portion; and visually distinguish the first media asset identifier in the first portion from the second media asset identifier in the first portion based on the first priority being different from the second priority.

11. The system of claim 10, wherein the control circuitry is further configured to:

store, in the storage device, a first visual indicator associated with the first priority and a second visual indicator associated with the second priority; and generate for display the first media asset identifier with the first visual indicator and the second media asset identifier with the second visual indicator.

12. The system of claim 10, wherein the control circuitry is further configured to:

assign the first priority to those events of the plurality of events that may be rescheduled and the second priority to those events of the plurality of events that may not be rescheduled;

in response to a user selection of the first media asset identifier, generate for display calendar data associated with the first event and providing an option to a user to reschedule the first event; and in response to a user selection of the second media asset identifier, generate for display calendar data associated with the second event and providing an option to the user to record the second media asset.

13. The system of claim 10, wherein the media asset identifiers in the first portion are visually distinguished from the media asset identifiers in the second portion by a first type of an indicator and the first media asset identifier is visually distinguished from the second media asset identifier with a second type of an indicator.

14. The system of claim 13, wherein types of indicators comprise colors, shadings, and icons.

15. The system of claim 10, wherein the control circuitry when comparing the event time intervals of the plurality of events with the media asset time intervals of the first plurality of media assets is further configured to:

retrieve, for a first event in the plurality of events, a first start time and a first end time;

retrieve, for a first media asset in the first plurality of media assets, a second start time and a second end time;

compare the first start time with the second start time and the second end time and comparing the first end time with the second start time and the second end time; and based on determining that the first start time or the first end time falls between the second start time and the second end time, generate a first conflict indicator for the first media asset.

16. The system of claim 10, wherein the control circuitry is further configured to:

in response to a user selection of a third media asset identifier in the first portion, generate for display an option to create a new event corresponding to a third media asset associated with the third media asset identifier;

in response to a user selection of the option, create the new event having an event start time and an event end time corresponding to a media asset start time and media asset end time of the third media asset, respectively; and transmit the new event to the calendar application.

17. The system of claim 10, wherein the control circuitry is further configured to:

receive, from the calendar application, calendar data for a plurality of events associated with a different user, wherein the calendar data associated with the different user comprises event time intervals having associated event start times and end times;

in response to a user selection of a third media asset identifier in the first portion of the second plurality of media assets, determine whether a transmission time of a media asset associated with the third media asset identifier overlaps at least in part with at least one of the event time intervals associated with the different user; and based on determining that the transmission time of the media asset associated with the third media asset identifier does not overlap at least in part with at least one of the event time intervals associated with the different user, generate for display an option to invite the different user to consume the media asset associated with the third media asset identifier.

18. The system of claim 10, wherein the control circuitry is further configured to:

retrieve, from a server associated with a social networking application, a plurality of user identifiers associated with friends of the user;

retrieve, for each user identifier in the plurality of user identifiers, calendar data for a plurality of events associated with each friend, wherein the calendar data comprises event time intervals having associated event start times and end times;

in response to a user selection of a third media asset identifier in the second plurality of media asset identifiers, generate for display one or more user identifiers associated with those friends of the user that are scheduled to consume a media asset corresponding to the third media asset identifier.

* * * * *